United States Patent
Hsieh et al.

(10) Patent No.: US 12,530,322 B1
(45) Date of Patent: Jan. 20, 2026

(54) FILE MANAGEMENT SYSTEM WITH CLUSTERIZED FILE DEDUPLICATION

(71) Applicant: Primodium Inc., San Jose, CA (US)

(72) Inventors: Meng Hsuen Hsieh, San Jose, CA (US); Meng Ju Hsieh, San Jose, CA (US)

(73) Assignee: Primodium Inc., San Jose, CA (US)

( * ) Notice: Subject to any disclaimer, the term of this patent is extended or adjusted under 35 U.S.C. 154(b) by 0 days.

(21) Appl. No.: 19/287,328

(22) Filed: Jul. 31, 2025

(51) Int. Cl.
*G06F 16/174* (2019.01)
*G06F 7/16* (2006.01)
*G06F 16/16* (2019.01)

(52) U.S. Cl.
CPC ............ *G06F 16/1748* (2019.01); *G06F 7/16* (2013.01); *G06F 16/16* (2019.01)

(58) Field of Classification Search
CPC .............................. G06F 16/1748; G06F 7/16
See application file for complete search history.

(56) References Cited

U.S. PATENT DOCUMENTS

| | | | |
|---|---|---|---|
| 9,529,540 B1* | 12/2016 | Rus | G06F 3/0665 |
| 10,956,346 B1* | 3/2021 | Ben-Yehuda | G06F 13/4027 |
| 11,086,545 B1* | 8/2021 | Dayal | G06F 3/067 |
| 11,334,543 B1* | 5/2022 | Anwar | G06F 16/254 |
| 2004/0264810 A1* | 12/2004 | Taugher | G06F 16/54 |
| | | | 707/E17.02 |
| 2010/0172550 A1* | 7/2010 | Gilley | G11B 27/034 |
| | | | 382/218 |
| 2018/0196824 A1* | 7/2018 | Bitincka | G06F 3/0611 |
| 2021/0133174 A1* | 5/2021 | Goswami | G06F 16/2246 |
| 2025/0110650 A1* | 4/2025 | Kharbanda | G06F 3/0604 |

* cited by examiner

*Primary Examiner* — Kris E Mackes
(74) *Attorney, Agent, or Firm* — Cognition IP, P.C.; Edward Steakley; Schiller Hill

(57) ABSTRACT

Systems and methods for file sorting and de-duplication of files in a filesystem. A reverse path crawl may be performed followed by clustering files into file buckets. The clustering may be followed by one or more steps of combining file buckets based on one or more criteria. The merged content of the files in each file bucket may be analyzed and a similarity score may be calculated for each pair of files in the bucket. Based on the similarity score, the system may split each bucket into one or more dissimilar buckets. The dissimilar buckets may have a canonical file selected for each and a canonical file name created/chosen for said selected canonical file.

19 Claims, 24 Drawing Sheets

100

303
Similarity Graph (edges ≥ 0.9)
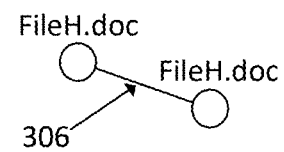
FileH.doc
306
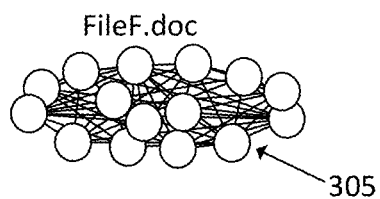
FileF.doc
305
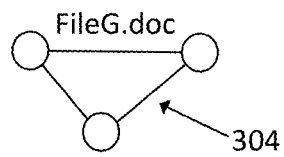
FileG.doc
304
FIG. 3C

500

- 501 Prepare a plurality of objects for sorting, wherein the preparing comprises generating a pool of objects by digitizing the plurality of objects and removing artifacts.
- 502 Perform a reverse path crawl over the pool of objects.
- 503 Create, based on the reverse path crawl, one or more object buckets.
- 504 Cluster the plurality of objects into the one or more object buckets based on the reverse path crawl.
- 505 Create one or more merged buckets by combining, into a single merged bucket, one or more object buckets that share one or more properties.
- 506 Split each merged bucket into one or more dissimilar buckets.
- 507 Select, for each dissimilar bucket, a canonical object.
- 508 Generate, for each canonical object, a canonical name, wherein the canonical name is representative of the objects in the associated dissimilar bucket.
- 509 Generate a sorted bucket list, wherein the list comprises each dissimilar bucket.
- 510 Display, in a user interface, a graphical representation of one or more dissimilar buckets.

FIG. 5

FILE MANAGEMENT SYSTEM WITH CLUSTERIZED FILE DEDUPLICATION

CROSS-REFERENCE TO RELATED APPLICATIONS

None

FIELD

The present invention relates generally to systems, tools and methods to sort, cluster and manage files in a filesystem.

BACKGROUND

A person or an organization that creates regular backups of digital information typically have large numbers of files scattered across multiple CDs, DVDs, flash drives, floppy disks, and cloud-based storage media. In many cases, a given file can be duplicated across any media, with slightly different content and filenames due to revisions and content changes (e.g., file1.txt, 1 file1.txt, file1 v2.txt).

Managing, documenting, retrieving and archiving files becomes increasingly difficult as the files are duplicated across media and accounts and modified from different devices.

Simple comparison of filenames cannot be used to identify duplicate files as many it would not be possible to tell if two files that share the same or similar name are in fact the same file or completely unrelated files.

A simplified method of managing and deduplicating files and content across different media and platforms is needed. The invention disclosed improves the storage, accessing and management of files and content through clustering of files in file buckets based on similarity of content and filenames and automatically selecting a canonical file to represent said file buckets. This allows for more efficient access to files and their content, saving significant time searching for files or other content/media.

SUMMARY

The systems and methods described herein provide for sorting objects in a filesystem. In some embodiments, the objects may correspond to a plurality of files. The system and methods may comprise preparing a plurality of objects for sorting, wherein the preparing may comprise generating a pool of objects by digitizing the plurality of objects and removing artifacts. The system may then perform a Reverse Path Crawl over the pool of objects.

In some embodiments, the Reverse Path Crawl may comprise fetching path information for each object. The path information may be flattening into a path list. The system may then perform, for each path list, a pairwise matching.

In some embodiments, the system may then create, based on the Reverse Path Crawl, one or more object buckets. The plurality of objects may then be clustered into the one or more object buckets based on the Reverse Path Crawl. One or more merged buckets may be created by combining, into a single merged bucket, one or more object buckets that share one or more properties.

In some embodiments, the system may be configured to split each merged bucket into one or more dissimilar buckets. The splitting may comprise calculating, for every pair of objects in each merged bucket, a similarity score. Based on the calculated similarity scores, one or more graphs of strongly connected objects may be created, wherein the similarity score for all the strongly connected objects of the graph are above a predetermined threshold. In some embodiments, one or more dissimilar buckets may be created. Creation of the one or more dissimilar buckets may be based on the one or more graphs of strongly connected objects, wherein each dissimilar bucket may correspond to a group of strongly connected objects within said graphs.

In some embodiments, a canonical object may be selected for each dissimilar bucket. Selecting may comprise extracting content from each object in each dissimilar bucket. For each object, a richest content score may be calculated based on the extracted content. The canonical object may then be selected for each dissimilar bucket based at least in part on the richest content score.

In some embodiments, a canonical name may be generated for each canonical object, wherein the canonical name is representative of the objects in the associated dissimilar bucket. In some embodiments, the canonical name may be generated based on names of the objects in the dissimilar bucket, paths of the objects in the dissimilar bucket and content of the objects in the dissimilar bucket.

The system may then generate a sorted bucket list, wherein the sorted bucket list comprises each dissimilar bucket.

In some embodiments, the system may then display, in a user interface, a graphical representation of one or more dissimilar buckets. In some embodiments, the graphical representation may comprise the canonical name associated with the canonical object of the dissimilar bucket.

The appended claims may also serve as a summary of this application.

The features and components of these embodiments will be described in further detail in the description which follows. Additional features and advantages will also be set forth in the description which follows, and in part will be implicit from the description, or may be learned by the practice of the embodiments. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 3C is a diagram illustrating an exemplary graph of strongly connected components in accordance with aspects of the present disclosure.

FIG. 5 is a flow chart illustrating an exemplary method that may be performed in accordance with some embodiments.

DETAILED DESCRIPTION

Figure 1:
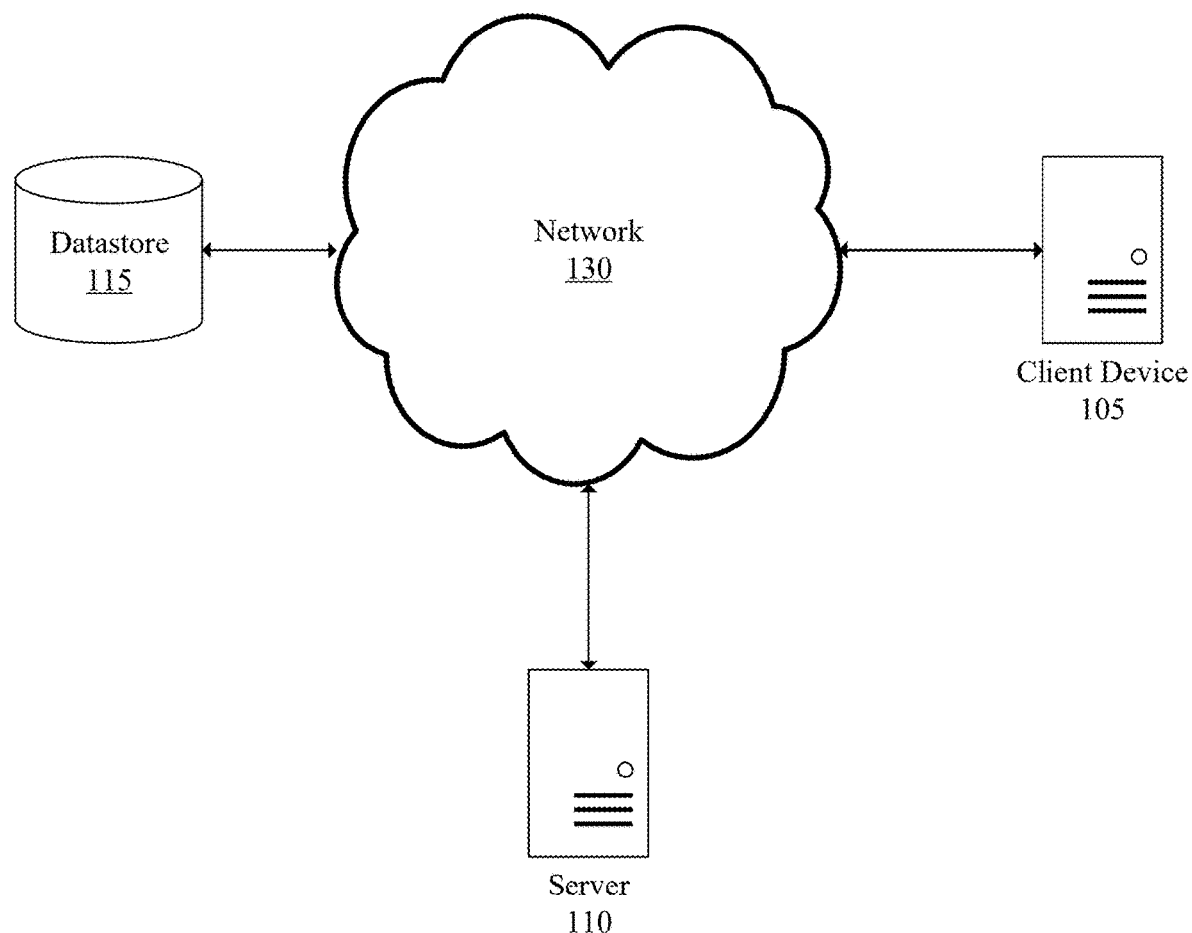
FIG. 1 is a diagram illustrating an exemplary file sorting system in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system and methods for analyzing, clustering, and managing duplicate files in a filesystem or across platforms.

The system may be configured to perform a Reverse Path Crawl and clustering files into file buckets by file name. The clustering may be followed by one or more step of combining file buckets based on file extensions and identifying supersets of bucket names. The merged content of the files in each file bucket may be analyzed and a similarity score may be calculated for each pair of files in the bucket. Based on the similarity score, the system may generate a graph of strongly connected elements, wherein the connected elements have a similarity score above a predetermined threshold. The graph may then be used to generate dissimilar buckets for each cluster of strongly connected elements (files).

Processing of the files in the filesystem in this manner solves the main issues that plague naïve approaches to identifying duplicate files. Naïve approaches fail at accurately and efficiently clustering or otherwise identifying duplicate files. Some approaches such as hashing of the files cannot be used since slight variations in the file results in an entirely different hash. Comparing of filenames cannot distinguish between files that share a name or similar names, as a file with the same name may be a copy of the file, a version of the file or a completely unrelated file.

Another problem that the disclosed system and methods solves is the identifying and naming of a canonical file from each file bucket.

Naïve approaches of just picking the latest modified file within the file bucket cannot be used because a version before might have more content. For example, a slideshow presentation might have more slides for a 30-minute research talk in May 2024 and was abridged for a 10-minute research talk in June 2024.

Simply sorting by largest bytes cannot be used, because different versions of software packages have different file saving approaches and compression. For example, different versions of a word processing application may save files differently. One version may rewrite an entire file while another updates the file with changes. In some cases, different versions may use different font tables which result in different file sizes.

FIG. 1 is a diagram illustrating an exemplary duplicate file management system 100 in which some embodiments may operate.

The system 100 may comprise one or more client devices, 105, one or more servers 110, one or more datastores 115 and a network 130.

The client devices 105 may be one or more physical or virtual machines configured to communicate with the one or more servers 110 and one or more datastores 115 over network 130.

The servers 110 may be one or more physical or virtual machines configured to communicate with the one or more client devices 105 and one or more datastores 115. The one or more servers 110 may be configured as a distributed computing infrastructure.

Datastores 115 may communicate with one another over network 130. Datastores 115 may be any storage device capable of storing data for processing or as a result of processing information at the client devices 105 and/or servers 110. The datastores 115 may be a separate device or the same device as server 110. The datastores 115 may be located in the same location as that of servers 110, or at separate locations.

Network 130 may be an intranet, internet, mesh, LTE, GSM, peer-to-peer or other communication network that allows the one or more client devices 105, servers 110 and datastores 115 to communicate with one another.

Figure 2:
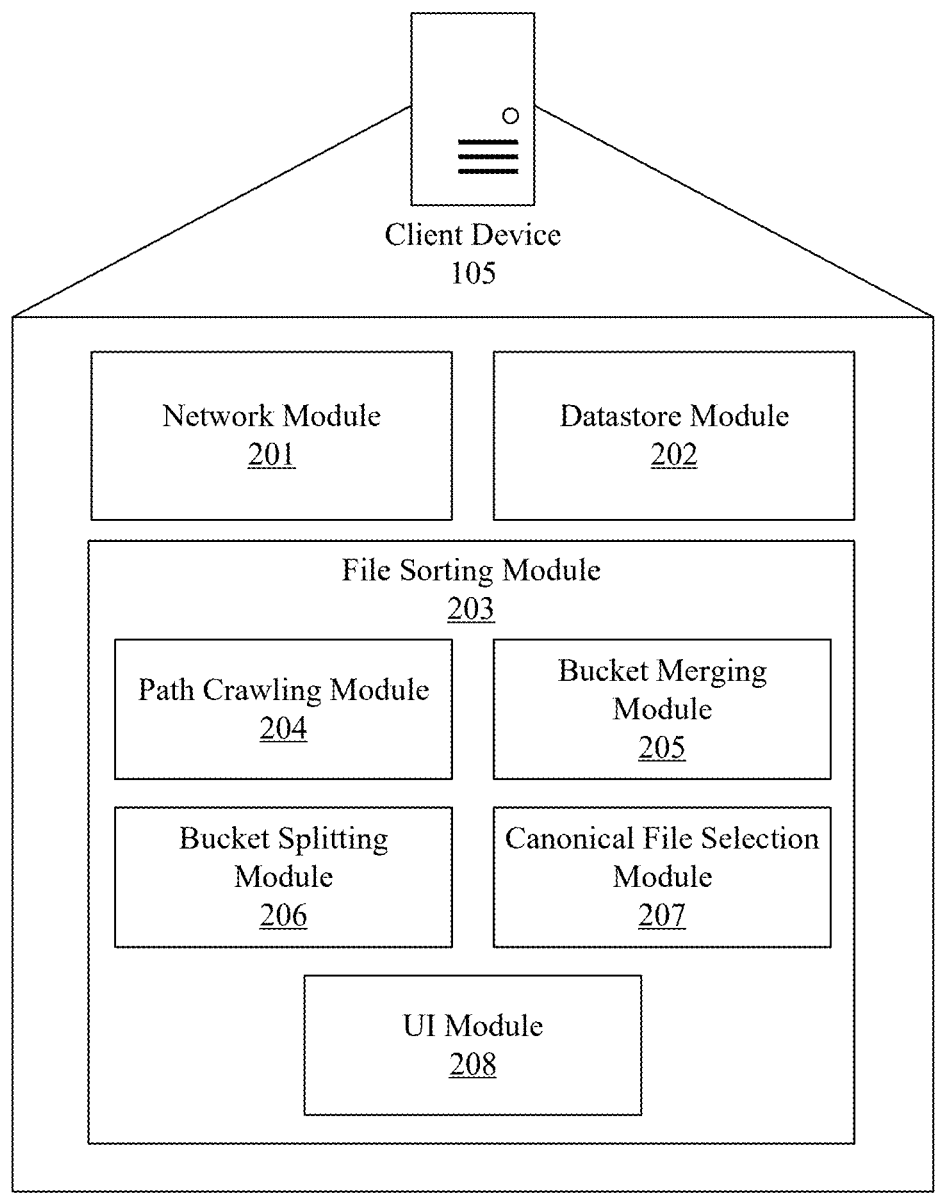
FIG. 2 is a diagram illustrating an exemplary client device in accordance with aspects of the present disclosure.

FIG. 2 is a diagram illustrating an exemplary client device 105 in accordance with aspects of the present disclosure. Client device 105 may comprise a network module 201, a datastore module 202 and a file sorting module 203. File sorting module 203 may further comprise path crawling module 204, bucket merging module 205, bucket splitting module 206, canonical file selection module 207 and UI module 208.

Network module 201 may transmit and receive data from other computing systems via a network such as network 130 as described above with regard to FIG. 1. In some embodiments, the network module 201 may enable transmitting and receiving data from the Internet. Data received by the network module 201 may be used by the other modules. The modules may transmit data through the network module 201.

The datastore module 202 may be configured to store information generated by the one or more modules operating on the client device 105. The one or more modules operating on the client device 105 may also retrieve information from the datastore module 202. Datastore module 202 may also be configured to receive and store information received over network module 201.

File sorting module 203 may be configured to perform a plurality of file sorting processes on one or more files in a filesystem. The files may be stored locally or remotely from the client device 105. In some embodiments, the file sorting module 203 may be configured to generate one or more file buckets and to place the one or more files into the one or more buckets. Each bucket may hold one or more files. Each file may only be placed in a single bucket. In some embodiments, all files from all media sources may be digitized to run in preparation for performing the sorting process. In some embodiments, a subset of files and media sources may be selected for digitization and sorting.

In some embodiments, the file sorting process may be run in both monolithic and parallel instances since file buckets can be processed between any steps for de-duplication. After digitizing the files, filesystem artifacts may be rejected from the initial pool.

Path crawling module 204 may be configured to perform a Reverse Path Crawl. The goal of the Reverse Path Crawl is to classify similar files as one single file bucket, with a file selected as a canonical file for said bucket.

The following is an example file structure:
floppydisk1/
  luteolin-paper-backup1/
    revisions/
      revision1.docx (last modified 2024 Apr. 4)
      revision2.docx (last modified 2024 Apr. 4)
  luteolin-paper-backup2/
    revisions/
      revision1.docx (last modified 2024 Feb. 1)
      revision2.docx (last modified 2024 Mar. 1)
cd2/
  luteolin-paper-backup1/
    revisions/
      revision1.docx (last modified 2024 Feb. 1)
      revision2.docx (last modified 2024 Mar. 1)
  luteolin-paper-backup2/
    revisions/
      revision1.docx (last modified 2024 Jun. 6)
      revision2.docx (last modified 2024 Jun. 6)

For the above exemplary file structure, the goal may be to classify revision1.docx and revision2.docx as one single file bucket, with revision2.docx as the canonical file.

There are two observations that may be made here: 1. revision2.docx does not necessarily have more bytes than revision1.docx. 2. The revisions folder was copied indiscriminately with all its contents to multiple forms of media, resulting in the FILE_MODIFIED field being reset upon each new copy.

The purpose of Reverse Path Crawl is to include file path information into each file before clustering into file buckets.

In some embodiments, the Reverse Path Crawl may be executed as follows:

1. A directory fetch limit parameter that describes the maximum number of parent directories to pairwise match file paths with may be set (DIRECTORY_NAME_FETCH_LIMIT). This parameter may be adjusted. In some embodiments, the DIRECTORY_NAME_FETCH_LIMIT may be set to infinity by default. Each file may be matched, starting from the file name and up the directory tree in parallel until it reaches the top of the directory tree or until the number of upward traversals to a parent directory exceed the DIRECTORY_NAME_FETCH_LIMIT.

2. The file path of every file may be flattened into a list. For example, the file:
floppydisk1/
  luteolin-paper-backup1/
    revisions/
      revision1.docx (last modified 2024 Apr. 4)
may be flattened to: ["floppydisk1", "luteolin-paper-backup1", "revisions", "revision1.docx"]

3. Then, a pairwise matching may be performed starting from the bottom of the file tree (i.e., the filename and the last element of the above list) and group every file with its most common line of ancestors up until the DIRECTORY_NAME_FETCH_LIMIT. The results may be as follows:

["luteolin-paper-backup1", "revisions", "revision1.docx"]:
   floppydisk1/luteolin-paper-backup1/revisions/revision1.docx
   cd2/luteolin-paper-backup1/revisions/revision1.docx
["luteolin-paper-backup2", "revisions", "revision1.docx"]:
   floppydisk1/luteolin-paper-backup1/revisions/revision1.docx
   cd2/luteolin-paper-backup1/revisions/revision1.docx
["luteolin-paper-backup1", "revisions", "revision2.docx"]:
   floppydisk1/luteolin-paper-backup1/revisions/revision2.docx
   cd2/luteolin-paper-backup1/revisions/revision2.docx
["luteolin-paper-backup2", "revisions", "revision2.docx"]:
   floppydisk1/luteolin-paper-backup2/revisions/revision2.docx
   cd2/luteolin-paper-backup2/revisions/revision2.docx The path crawling module 204 may create a file bucket for each of the results.

In some embodiments, the path crawling module 204 may generate too many buckets, meaning that files that should have been clustered together were not. To reduce false negatives of files not being placed in the same bucket together, a clustering process may be performed by the bucket merging module 205.

The bucket merging module 205 may be configured to cluster the files by one or more steps and processes. In some embodiments, the bucket merging module 205 may apply one or more cleaning strategies to the directory name and the file name at every level of the file tree.

In some embodiments, the following cleaning strategy may be applied:
1. Removing all special characters and numbers ('[-( ).;",\\V]+')
2. Removing all numbers ([0-9]+)
3. Lower-casing all characters
4. Lemmatization using any strategy (e.g., broken, breaking, break→break)
5. Stemming using any strategy (e.g., traditional, tradition→trad)

In some embodiments, the pairwise matching may include both perfect string matching and any fuzzy string matching method, not limited to a fuzzy string searching algorithm based on Levenshtein distance.

In some embodiments, the bucket merging module 205 may further combine buckets by file extension. Some file extension pairs may have the exact functionality, for example: .jpg and .jpeg, .tiff and tif, .htm and .html and .txt and .text.

In some embodiments, files that were saved across different software versions may have newer extensions for files of the same document type, for example: .doc and .docx, .ppt and .pptx and .xls and .xlsx.

In some embodiments, the bucket merging module 205 may de-duplicate buckets that share the same filename but with a difference in each extension. For example, buckets named file.doc and file.docx will be combined.

In some embodiments, bucket merging module 205 may be configured to find bucket supersets. For each file bucket, the bucket merging module 205 may find other file buckets whose filename is a superset of the current bucket. For example, the bucket merging module 205 may find the bucket "presentation (1)" which is a superset of bucket "presentation". Both buckets may then be merged.

The previous greedy steps performed by the bucket merging module 205 may result in more files merged into buckets, i.e., the process introduced false positives that a given file belongs correctly to a given bucket. Within each bucket, the bucket splitting module 206 may be configured to move files that are dissimilar to different buckets to eliminate false positives.

For example, after the bucket merging module 205 greedy sorted each file into buckets, a given bucket may have the following files:
   presentations/
      luteolin presentation.pptx
      luteolin presentation 2.pptx
      luteolin presentation 3.pptx In this example, "luteolin presentation 2.pptx" could mean either part 2 of "luteolin presentation.pptx" or an entirely different presentation, which should be treated as different files. Bucket splitting module 206 may first serialize them into a format where they may be analyzed and compared to determine if "luteolin presentation 2.pptx" is a substring of "luteolin presentation.pptx", then classify it as a separate file right after the clustering/merging process.

In some embodiments, the bucket splitting module 206 may be configured to transform each file into text. For image files or binary files, the files may be serialized to base64 text. For text files, documents, presentations, or PDF files, text may be extracted with methods not limited to content extraction toolkits.

In some embodiments, the bucket splitting module 205 may perform a similarity scoring function. In some embodiments, the similarity scoring function may have the following constants defined:
   THRESHOLD_JACCARD=0.80: threshold above which we fine-tune with Levenshtein
   SMALL_DOC_CHARS=2000: documents smaller than this are considered "small"
   THRESHOLD_CONTAIN=0.95: if 95% of a set of shingles is inside another
   MIN_CLOSE_MATCH=0.90: two files are considered a close match if final score is greater In some embodiments, the above constants can also be defined and adjusted through algorithms not limited to machine learning techniques such as reinforcement learning with human feedback. In some embodiments, the parameters and constants may be iteratively adjusted through optimization algorithms such as gradient descent.

The scoring function may be defined as follows:
1. For every pair of files A and B, run Jaccard similarity scoring on n-shingles.
   Jaccard similarity refers to how similar two sets of strings are, as shown below:

$$J(A, B) = \frac{|A \cap B|}{|A \cup B|} = \frac{|A \cap B|}{|A| + |B| - |A \cap B|}$$

n-shingles, or n-grams, refer to all the subsets of a set A with length n. Jaccard may be run on all the substrings of the file with length n. 2. Compute the containment ratio of each file, which is defined by calculating:

$$|A \cup B|, \frac{|A \cap B|}{|A|} \text{ and } \frac{|A \cap B|}{|B|}.$$

3. Based on the above calculations, determine the following conditional:
   NEED_LEVENSHTEIN=(
      |A|<SMALL_DOC_CHARS or
      |B|<SMALL_DOC_CHARS or
      JACCARD(A, B)>=THRESHOLD_JACCARD or
      |A∩B|/|A|>=THRESHOLD_CONTAIN or
      |A∩B|/|B|>=THRESHOLD_CONTAIN)
   For files that are smaller than SMALL_DOC_CHARS, the small number of shingles creates a high variation based on small word differences relative to the file size. If a file has a low Jaccard index, we reject file pairing outright.
4. If the NEED_LEVENSHTEIN returns false, return JACCARD (A, B) as the final score.
5. If the NEED_LEVENSHTEIN returns true, we return the following as the score:
   # the function LEVENSHTEIN_RATIO( ) is run across file A and B in their original, wherein LEVENSHTEIN_RATIO( ) is the distance between two strings divided by the length of the larger of the two strings.
   # serialized content ordering, not on individual n-shingles
   LEV=1−LEVENSHTEIN_RATIO(A, B)
   SCORE=THRESHOLD_JACCARD+(1−THRESHOLD_JACCARD)*LEV In some embodiments, the Jaccard similarity step can be replaced with semantic matching techniques not limited to cosine similarity provided by a vectorization model (multimodal model, transformer model, generic neural network, deep neural network, multilayer perceptron, etc.) over the contents of the file.

After similarity scores are calculated between each pair of files, the bucket splitting module 206 may be configured to create graphs between file pairs where the similarity score between all strongly connected components of the graph is greater than MIN_CLOSE_MATCH. Each connected component of a given file bucket may then be split into their own file buckets.

Canonical file selection module 207 may be configured to find the canonical file from each bucket. In some embodiments, the canonical file selection module 207 may be configured to perform a canonical file identification and selection process. The canonical file identification and selection process may be performed on each of the file buckets. In some embodiments, each file of a file bucket may have all its content extracted. Based on the extracted content, a richest content score may be calculated for each file. Each of the files may then be sorted or ranked based at least in part on the richest content score.

In some embodiments, the richest content score calculation may be file type or content type specific. For example, for PDF files that only contain text, the calculation may comprise extracting all text objects and counting the text length. For text files, the calculation may comprise extracting the word count. For spreadsheets, the calculation may comprise extracting the number of filled cells. For slideshow or presentation type files, the calculation may comprise extracting the number of slides. For images, the calculation may be based on one or more techniques such as semantic entropy, edge density, object counting, or other image analysis techniques. In some embodiments, Canny edge detection may be used for edge density calculations. Other edge detection methods may also be used. In some embodiments, object counting may be performed by one or more segmentation techniques such as You Only Look Once (YOLO). For other files, the richest score calculation may be based on byte size of the file.

In some embodiments, the last modified date of each file may also be extracted and used to sort the files by latest to earliest.

In some embodiments, if the latest modified file ("latest file") has the highest richest content score (i.e. "largest file" for text files), the latest file may be selected as the canonical file.

In some embodiments, if the latest file is not the highest richest content score file, the system may be configured to calculate:
   a. the difference in modified time between the highest richest content score file and the latest file.
   b. the difference in bytes between the highest richest content score file and the latest file.

In some embodiments, the system may define two variables, ALLOWABLE_DIFF_FACTOR and ALLOWABLE_TIME_DIFFERENCE. These variables may be predetermined or dynamically set. In some embodiments, the predetermined values of the variables may be ALLOWABLE_DIFF_FACTOR=1.5 and ALLOWABLE_TIME_DIFFERENCE=1 year.

In some embodiments, if the highest richest content score file is more than ALLOWABLE_DIFF_FACTOR times larger than the latest file, the system may select the highest richest content score file as the canonical file. Otherwise, if the latest file is ALLOWABLE_TIME_DIFFERENCE newer than the highest richest content score file, the system may select the latest file as the canonical file. If the highest richest content score file is not more than the ALLOWABLE_DIFF_FACTOR times larger than the latest file, nor is the latest file ALLOWABLE_TIME_DIFFERENCE newer than the highest richest content score file, the system may select the highest richest content score file as the canonical file.

In some embodiments, the selecting process may be performed by a multimodal machine learning model, including but not limited to a large language model (LLM). In some embodiments, the system may be configured to prompt the LLM or the model to select a file with the highest richest content, either as a direct result of the model's selection or by calculating its own scoring index, for example:
   "This is a list of files on this filesystem:
      floppydisk1/luteolin-paper-backup1/revisions/revision1.docx
      cd2/luteolin-paper-backup1/revisions/revision1.docx
   Select the file that is the most representative of the list of files, taking into account the modified date and contents of the file. We want to prioritize the file with the latest modified date and the richest content; if there is no single file that fulfills both of these criteria, balance these two metrics and explain your reasoning."

After selection of the canonical file, the system may be configured to perform a naming process on the canonical file. The naming process may comprise running the Reverse Path Crawl step as defined above within each individual bucket. The final named canonical file for archival purposes may be set as the concatenated string of the longest path shared between all files in the bucket.

For example, for a file bucket with the following files:
   floppydisk1/luteolin-paper-backup1/revisions/revision1.docx
   cd2/luteolin-paper-backup1/revisions/revision1.docx
The final canonical file may be named luteolin-paper-backup1/revisions/revision1.docx.

In some embodiments, naming the canonical file can also be done with methods not limited to prompting a LLM for a summarized filename based on the list of files in a bucket, for example:

"This is a list of files on this filesystem:
floppydisk1/luteolin-paper-backup1/revisions/revision1.docx
cd2/luteolin-paper-backup1/revisions/revision1.docx
Provide a common filename based on the file names, file path, and file contents of the files listed above. The common filename must encapsulate the filenames and the content of all files provided."

In some embodiments, the UI module 208 may be configured to generate sorted output, wherein the sorted output comprises a list of canonical files. In some embodiments, the sorted output may be a spreadsheet with the root file name, final chosen files, bytes, last modified time, and path. In some embodiments, additional information may also be provided in the list. In some embodiments, less information may be provided in the list. In some embodiments, the list of canonical files may be displayed in a user interface where a user can see each root file. In some embodiments, the user may be prompted to verify that one or more of the displayed canonical files is the canonical instance of the corresponding file or file bucket associated with the file.

FIGS. 3A-3D are diagrams illustrating exemplary graphs of strongly connected components in accordance with aspects of the present disclosure.

In some embodiments, the graphs may be created after the similarity scores are calculated between each pair of filed. The graphs may be created for pairs where the similarity score of all strongly connected components of the graph is greater than a predetermined threshold value. The threshold value may be set by a user or set and adjusted by an optimization process. The graphs may be repeatedly generated with adjusted threshold values until a desired confidence level is reached with regards to the clusters generated. The example threshold value shown in FIGS. 3A-3D is 0.9 but may be adjusted as described above.

Figure 3A:
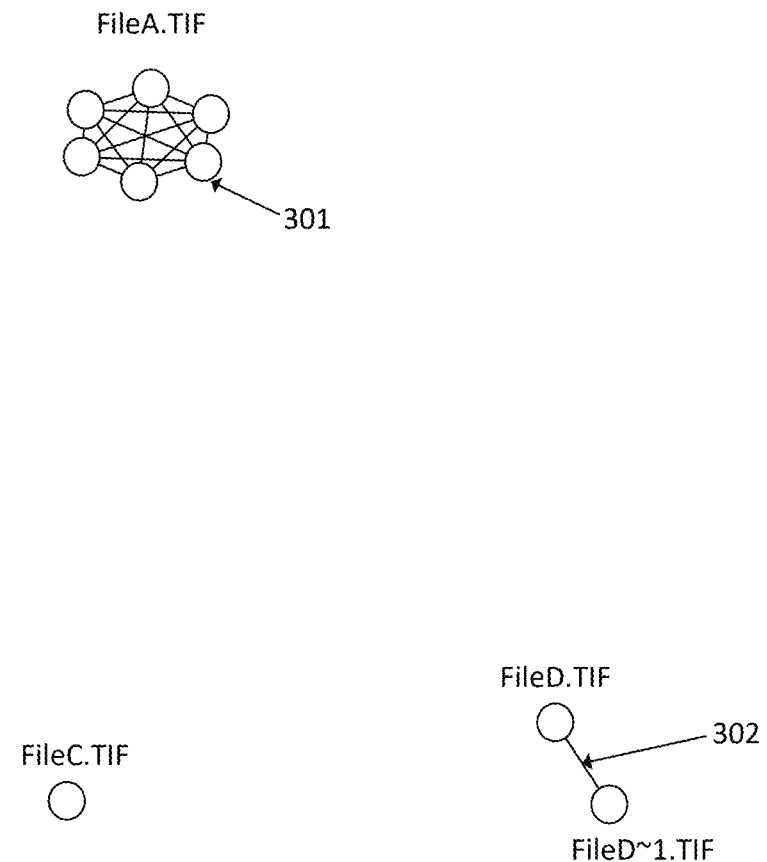
FIG. 3A is a diagram illustrating an exemplary graph of strongly connected components in accordance with aspects of the present disclosure.

FIG. 3A shows a similarity graph 300 with two clusters of strongly connected components/files, FileA.TIF 301 and FileD.TIF 302.

Figure 3B:
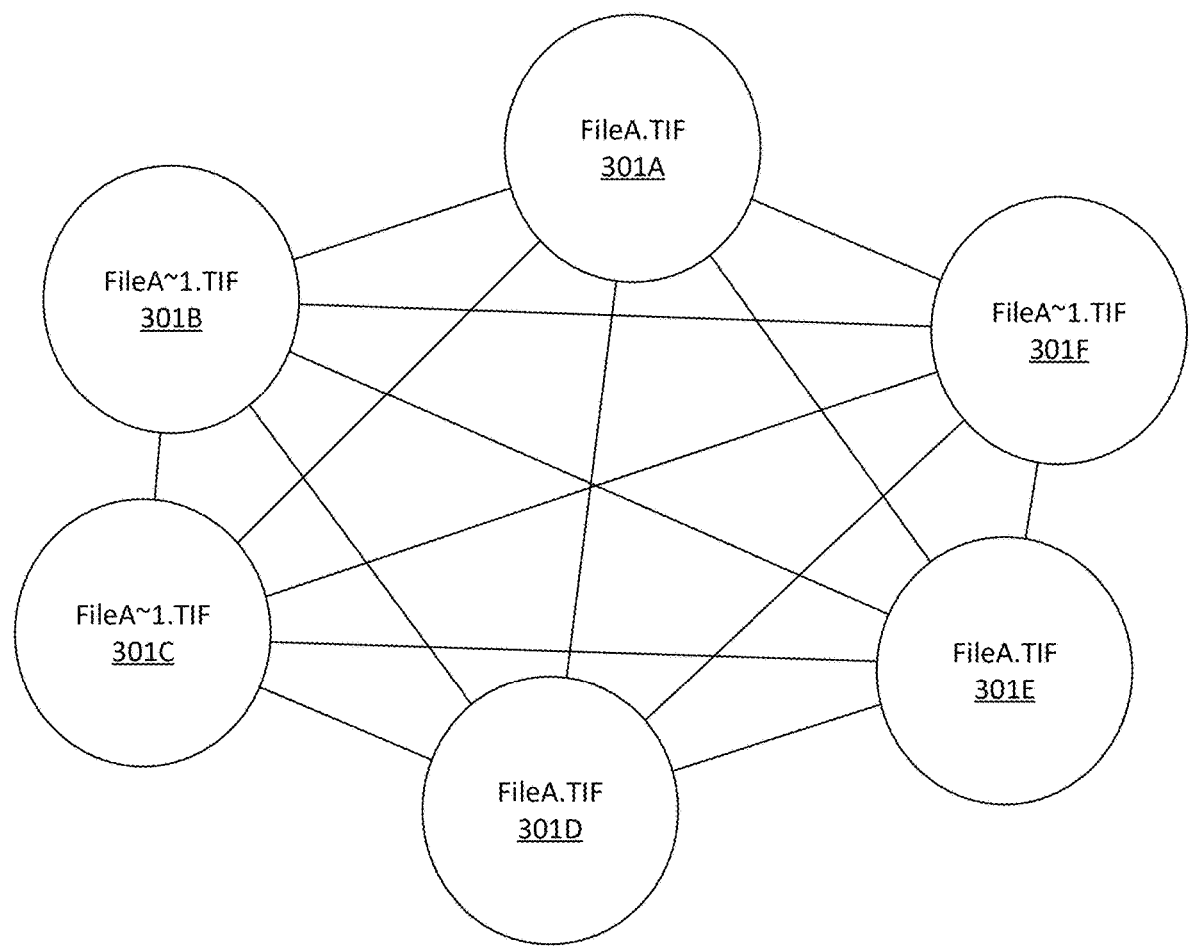
FIG. 3B is a diagram illustrating an exemplary graph of strongly connected components in accordance with aspects of the present disclosure.

FIG. 3B shows the connectivity graph of FileA.TIF 301. The connectivity graph 301 comprises components/files 301A-301F.

FIG. 3C shows a similarity graph 303 with three clusters of strongly connected components/files, FileG.doc 304, FileF.doc 305 and FileH.doc 306.

Figure 3D:
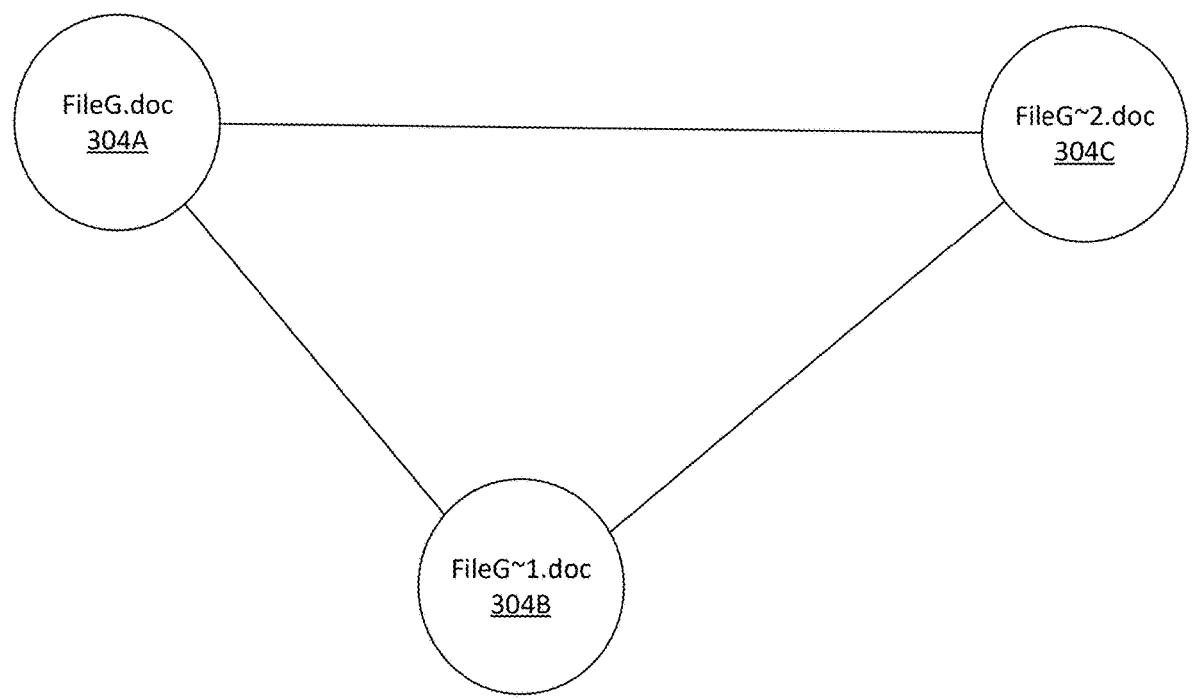
FIG. 3D is a diagram illustrating an exemplary graph of strongly connected components in accordance with aspects of the present disclosure.

FIG. 3D shows the connectivity graph of FileG.doc 304. The connectivity graph 304 comprises components/files 304A-301C.

Figure 4A:
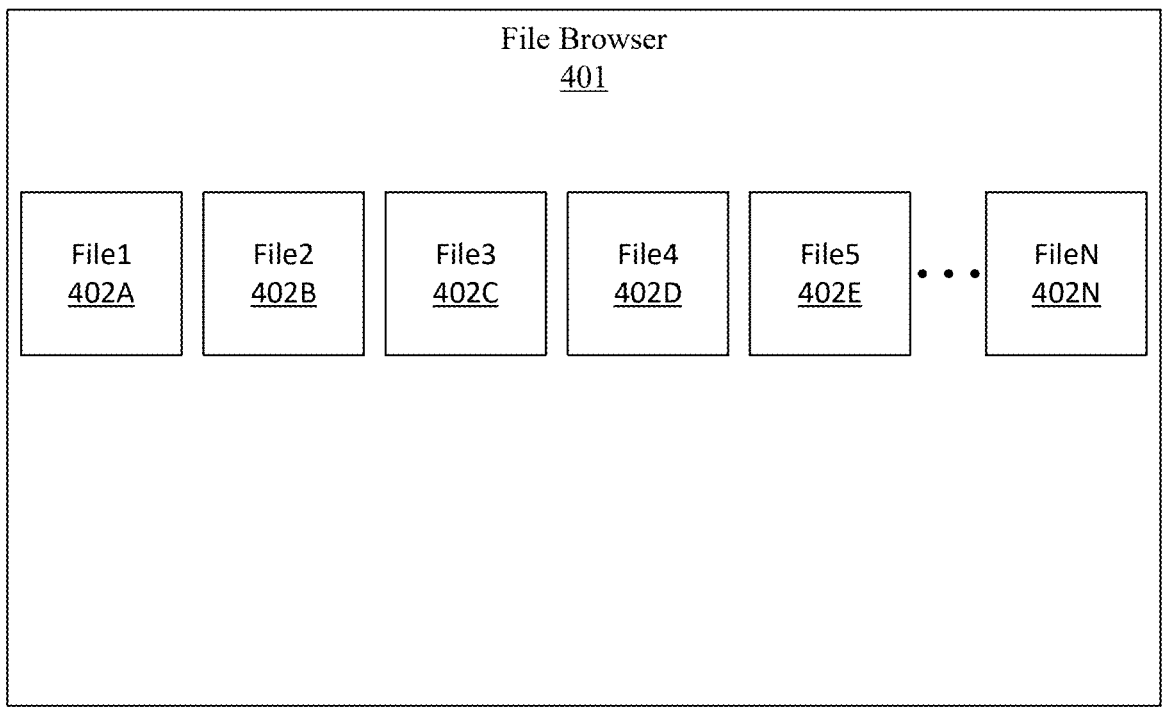
FIG. 4A is a diagram illustrating an exemplary user interface in accordance with aspects of the present disclosure.
Figure 4B:
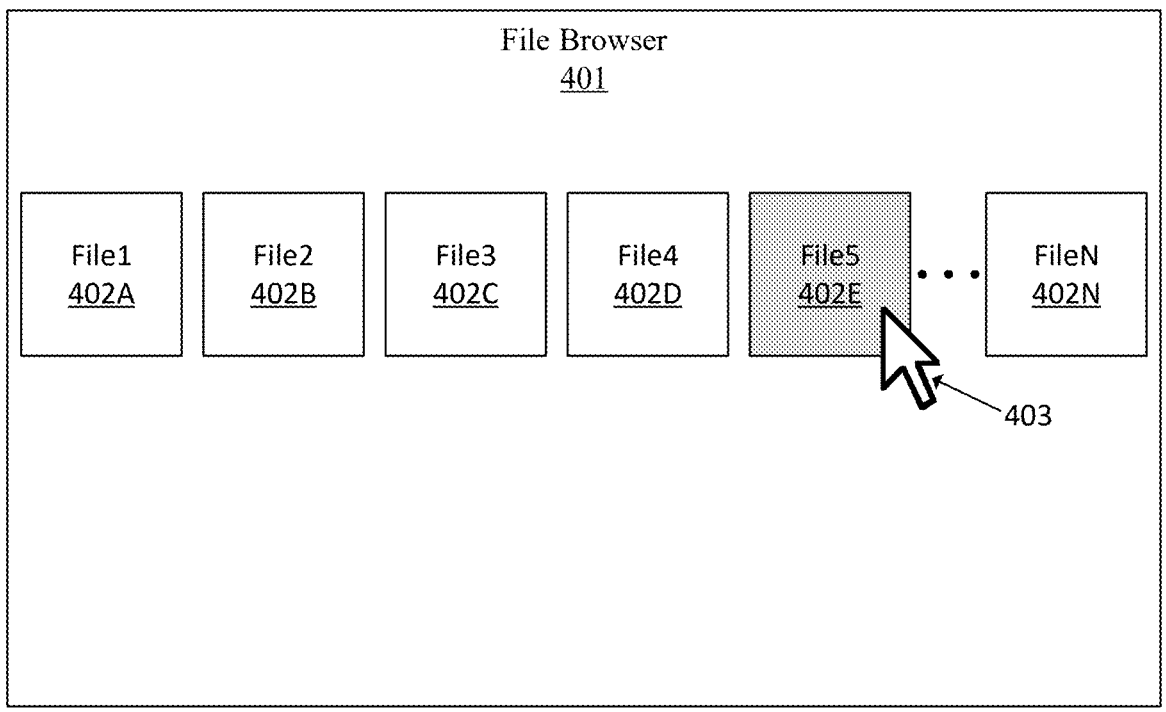
FIG. 4B is a diagram illustrating an exemplary user interface in accordance with aspects of the present disclosure.
Figure 4C:
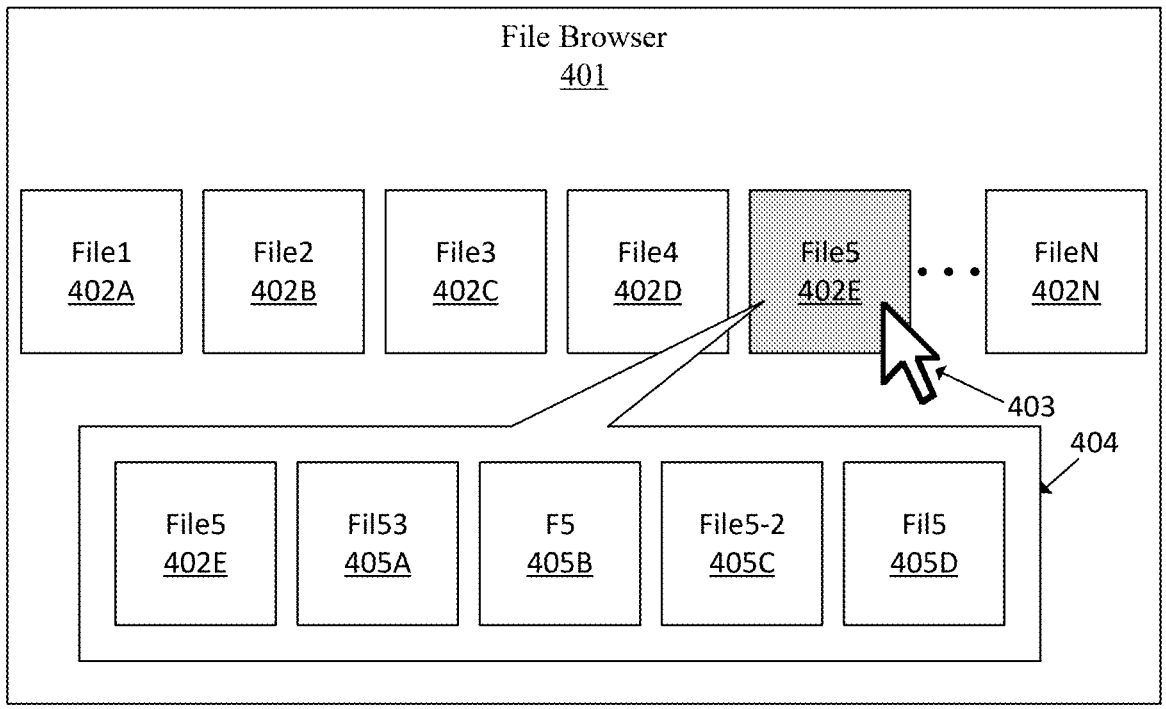
FIG. 4C is a diagram illustrating an exemplary user interface in accordance with aspects of the present disclosure.
Figure 4D:
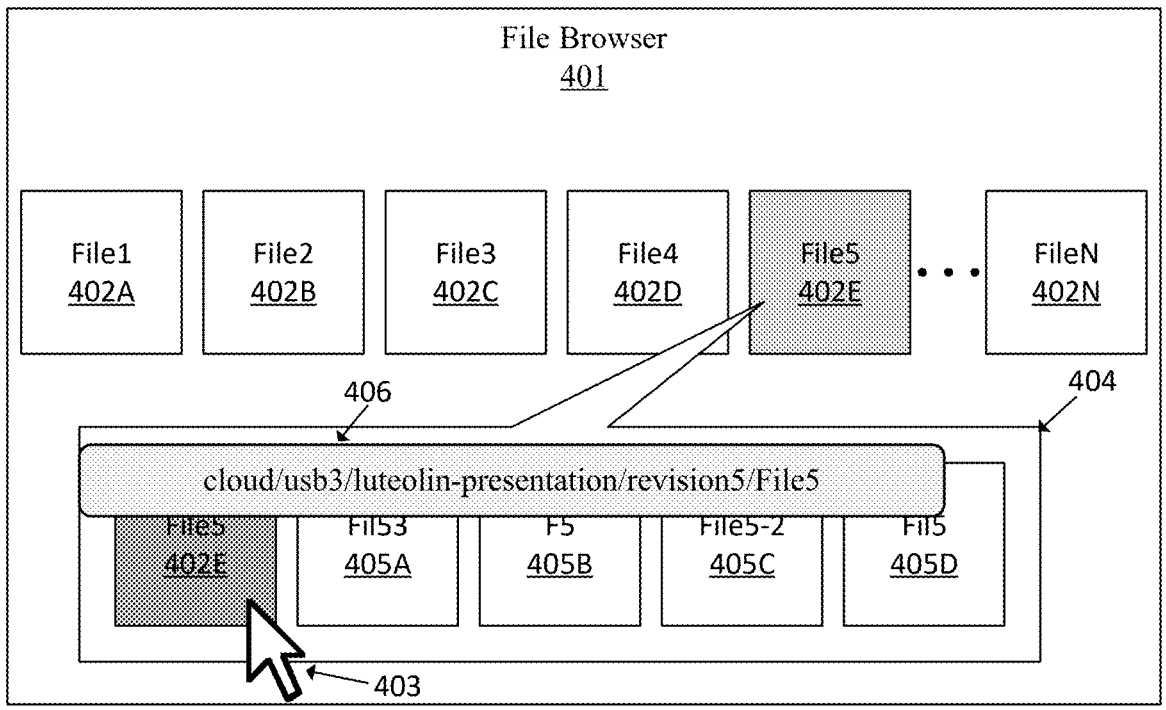
FIG. 4D is a diagram illustrating an exemplary user interface in accordance with aspects of the present disclosure.
Figure 4E:
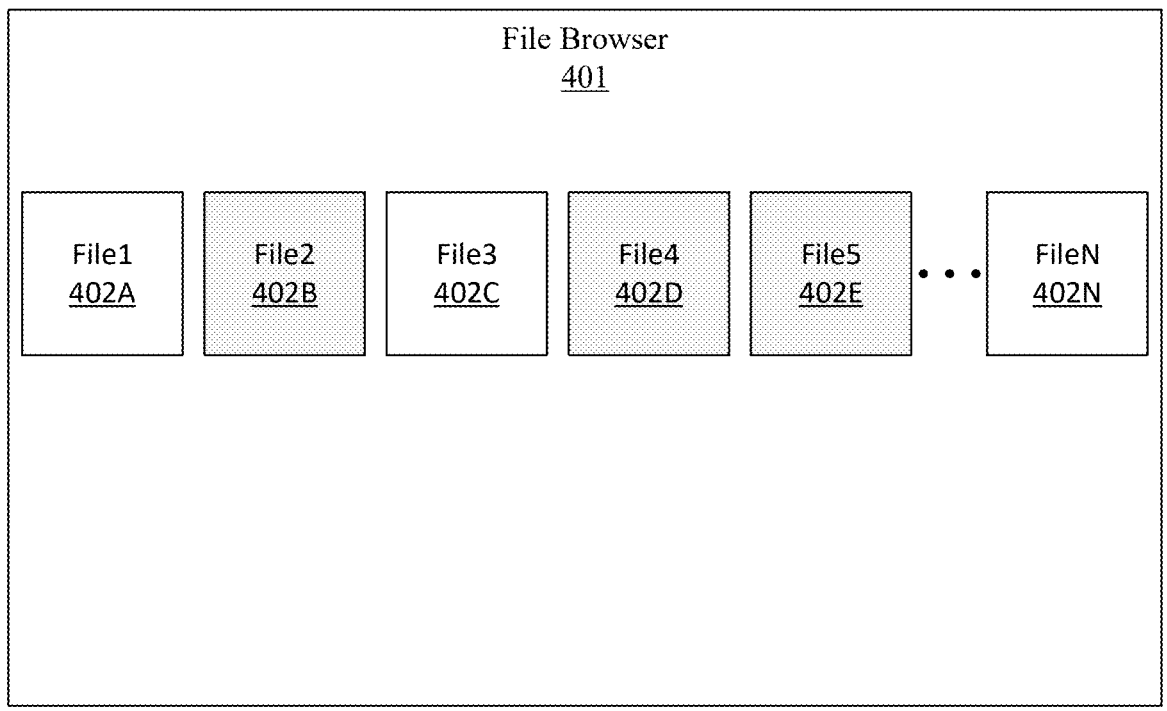
FIG. 4E is a diagram illustrating an exemplary user assisted selection process in accordance with aspects of the present disclosure.
Figure 4F:
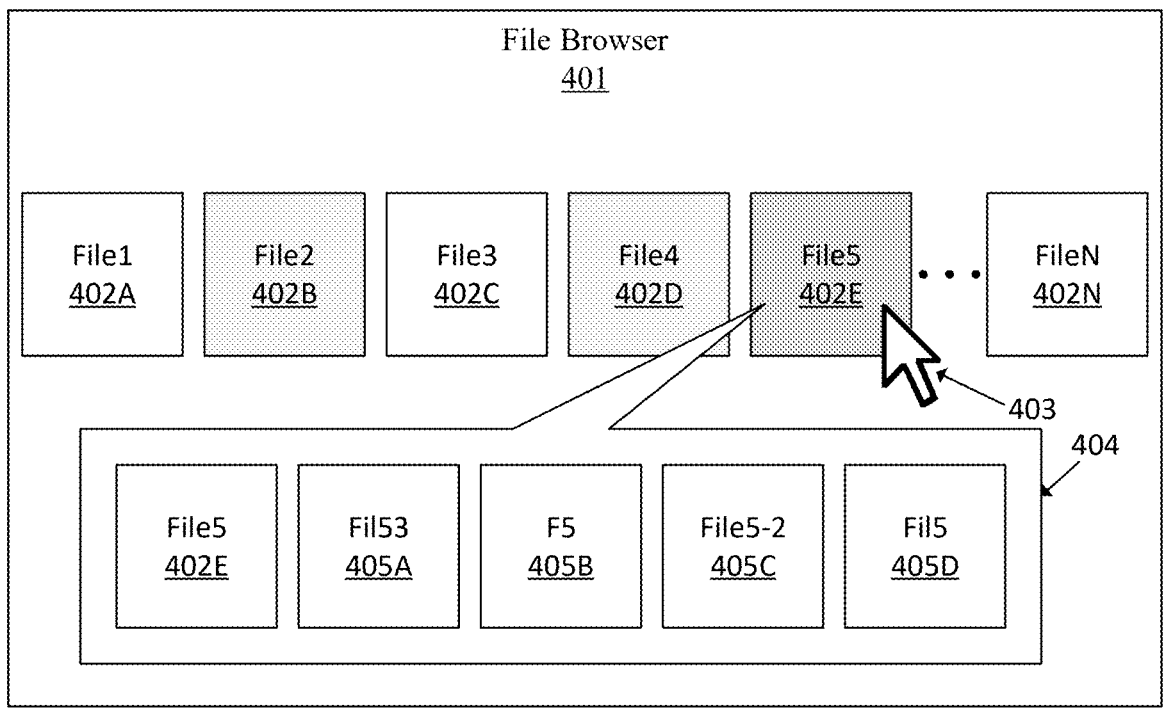
FIG. 4F is a diagram illustrating an exemplary user assisted selection process in accordance with aspects of the present disclosure.
Figure 4G:
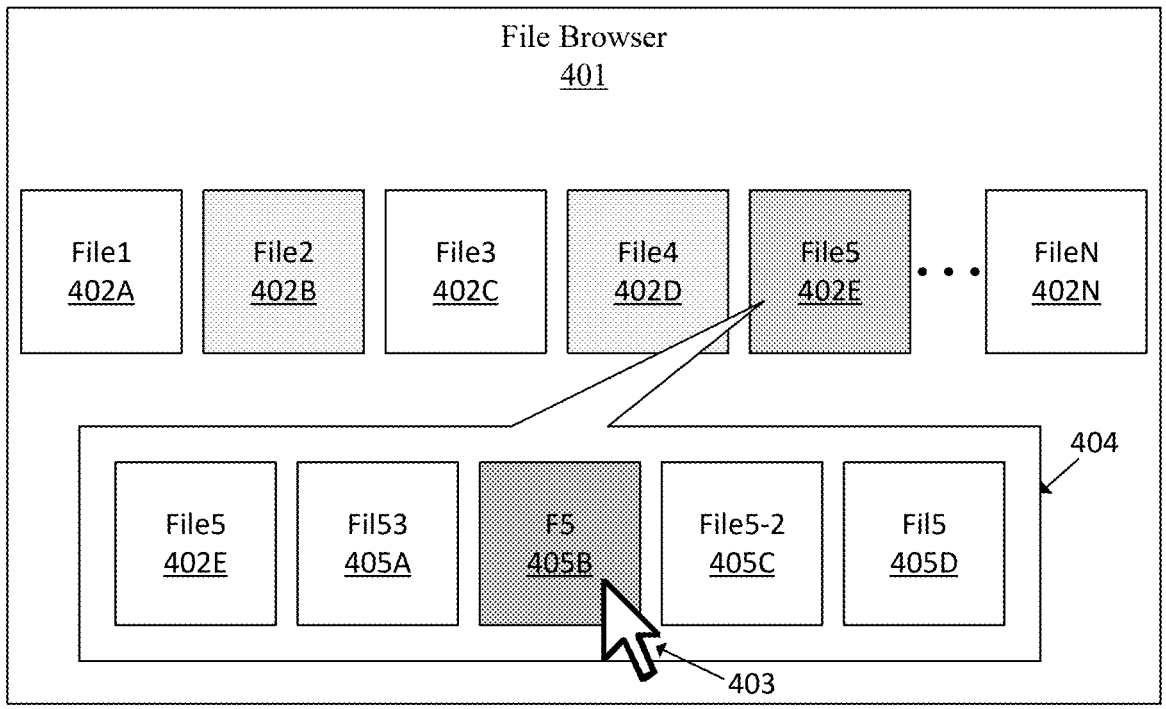
FIG. 4G is a diagram illustrating an exemplary user assisted selection process in accordance with aspects of the present disclosure.
Figure 4H:
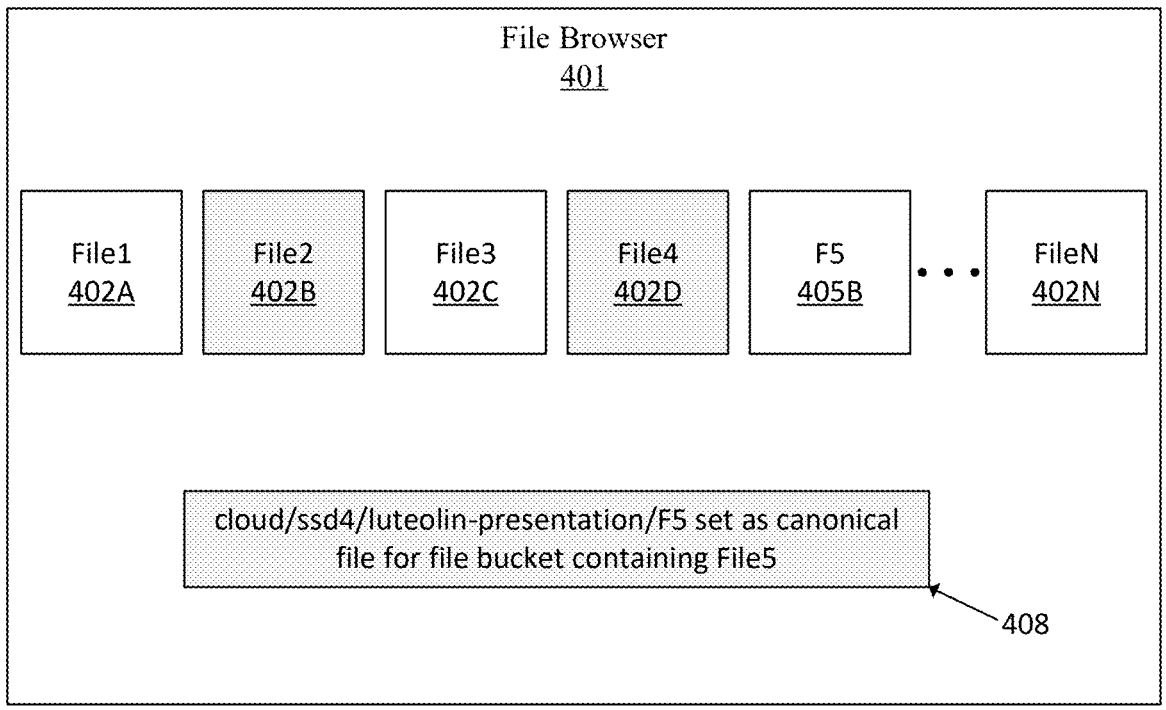
FIG. 4H is a diagram illustrating an exemplary user assisted selection process in accordance with aspects of the present disclosure.
Figure 4I:
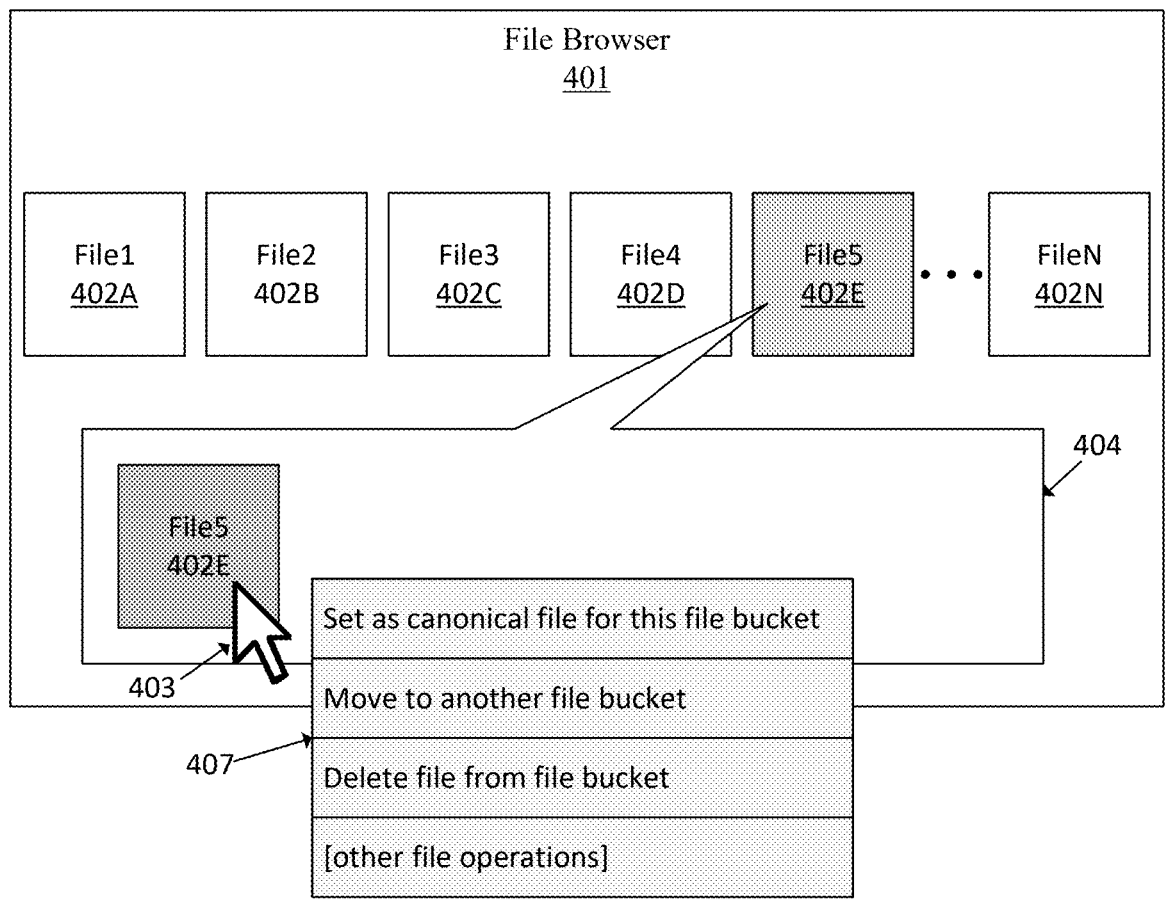
FIG. 4I is a diagram illustrating an exemplary user interface in accordance with aspects of the present disclosure.
Figure 4J:
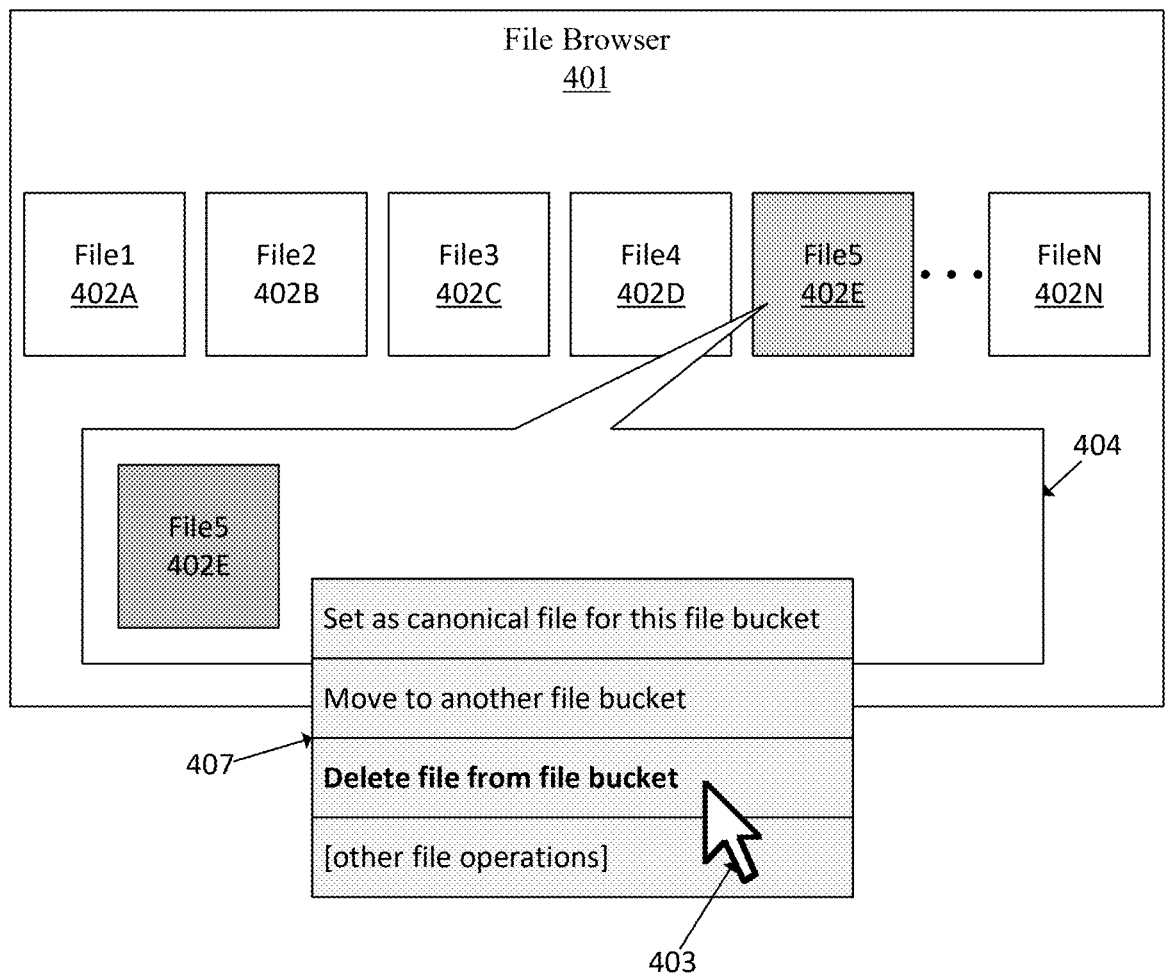
FIG. 4J is a diagram illustrating an exemplary user interface in accordance with aspects of the present disclosure.
Figure 4K:
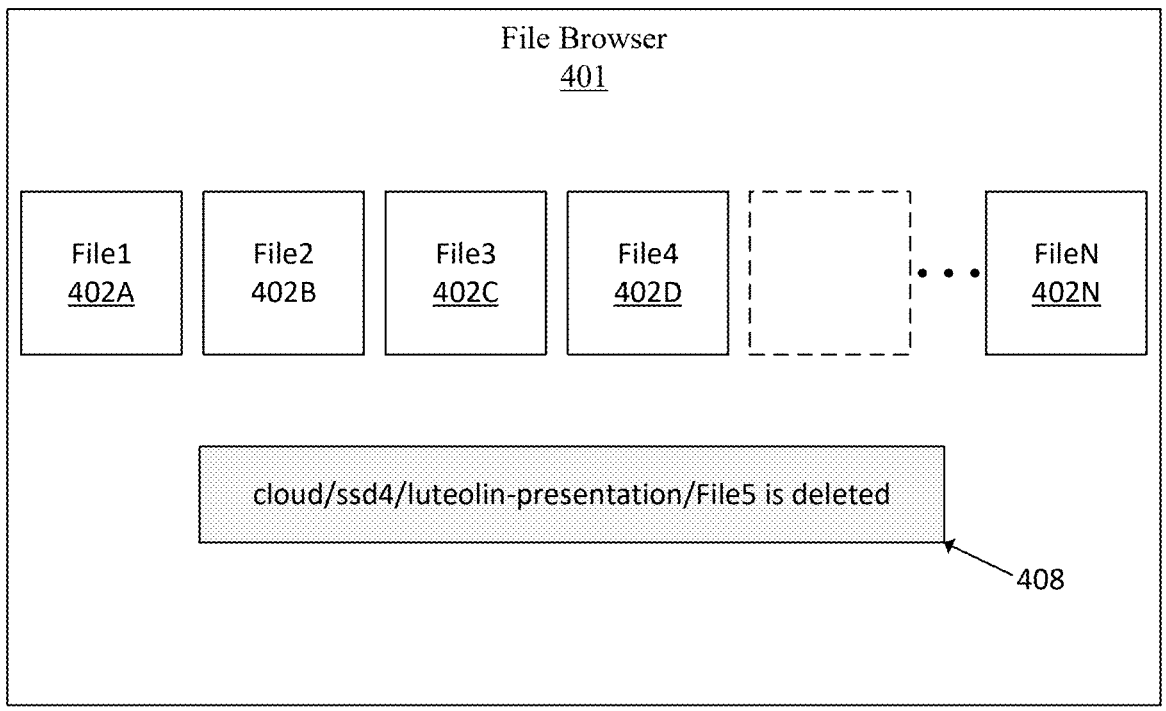
FIG. 4K is a diagram illustrating an exemplary user interface in accordance with aspects of the present disclosure.
Figure 4L:
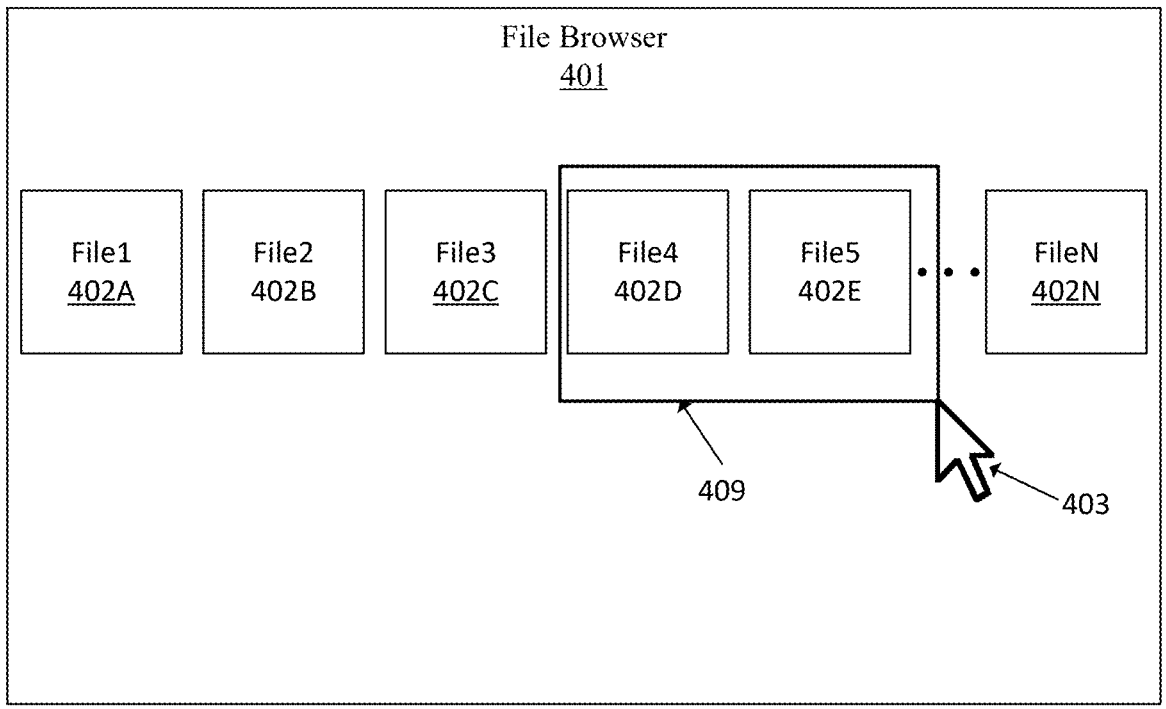
FIG. 4L is a diagram illustrating an exemplary user interface in accordance with aspects of the present disclosure.
Figure 4M:
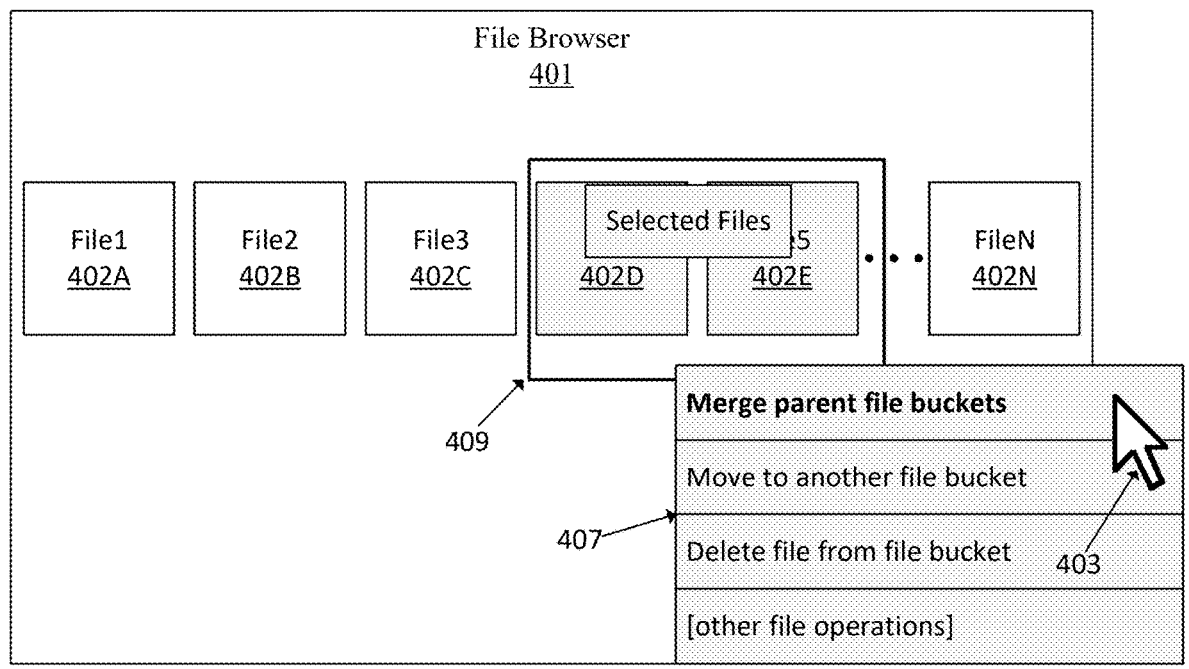
FIG. 4M is a diagram illustrating an exemplary user interface in accordance with aspects of the present disclosure.
Figure 4N:
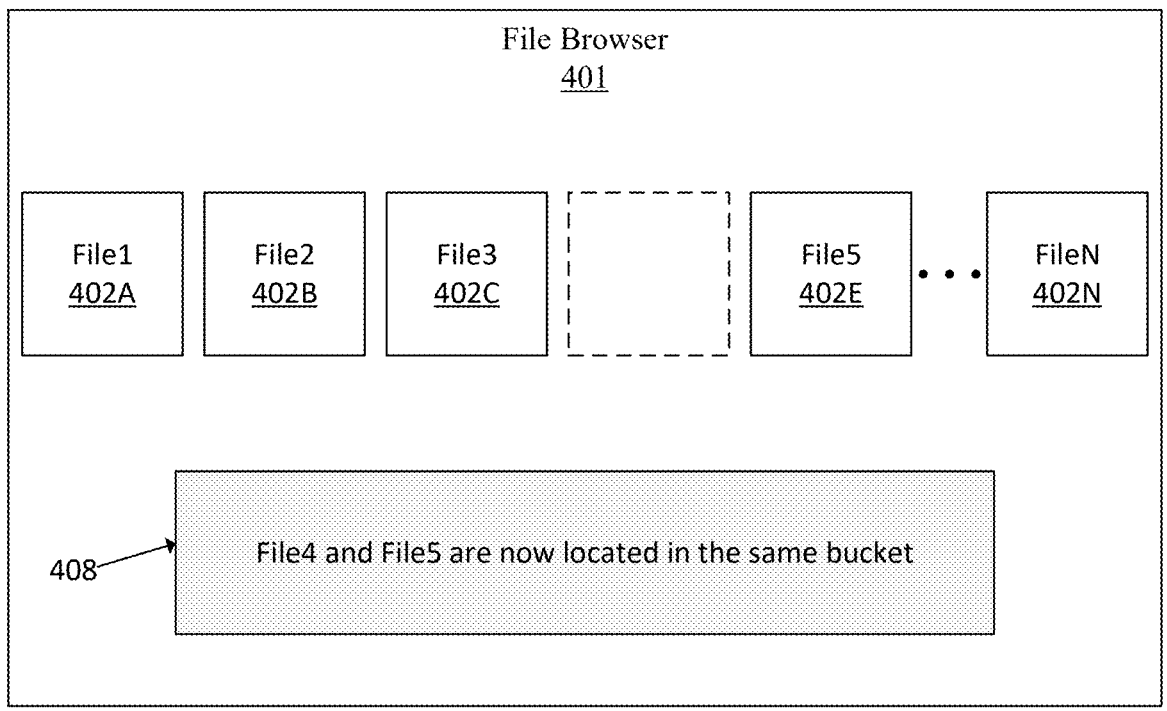
FIG. 4N is a diagram illustrating an exemplary user interface in accordance with aspects of the present disclosure.
Figure 4O:
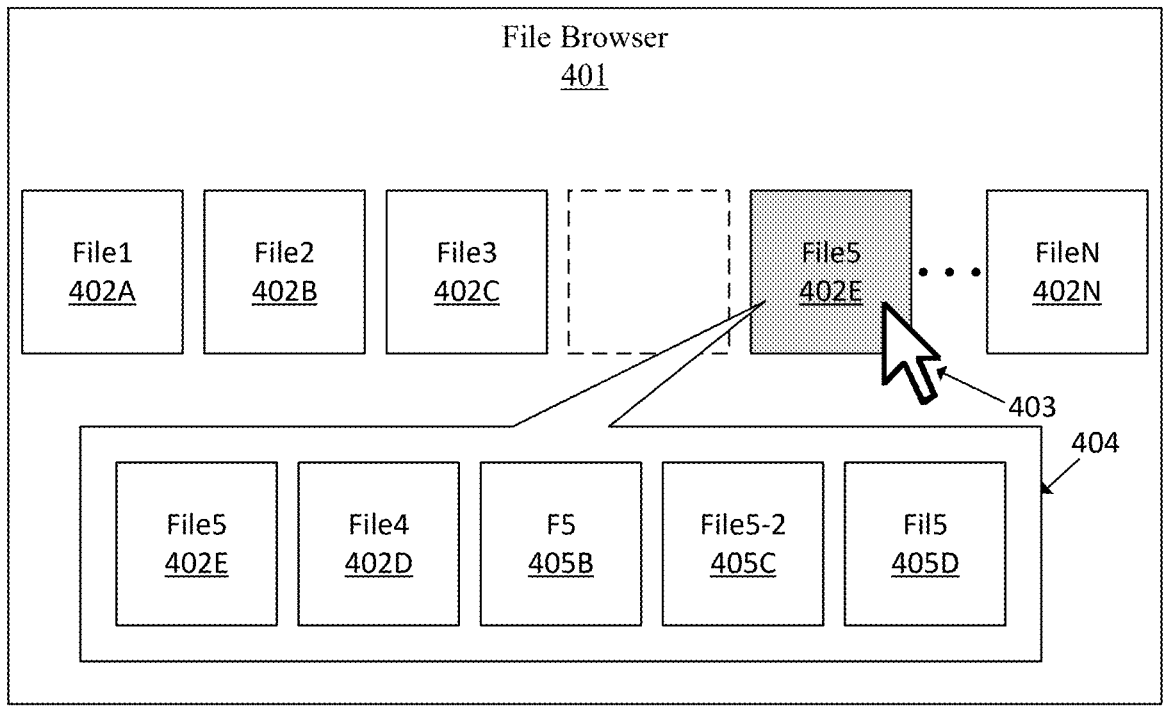
FIG. 4O is a diagram illustrating an exemplary user interface in accordance with aspects of the present disclosure.
Figure 4P:
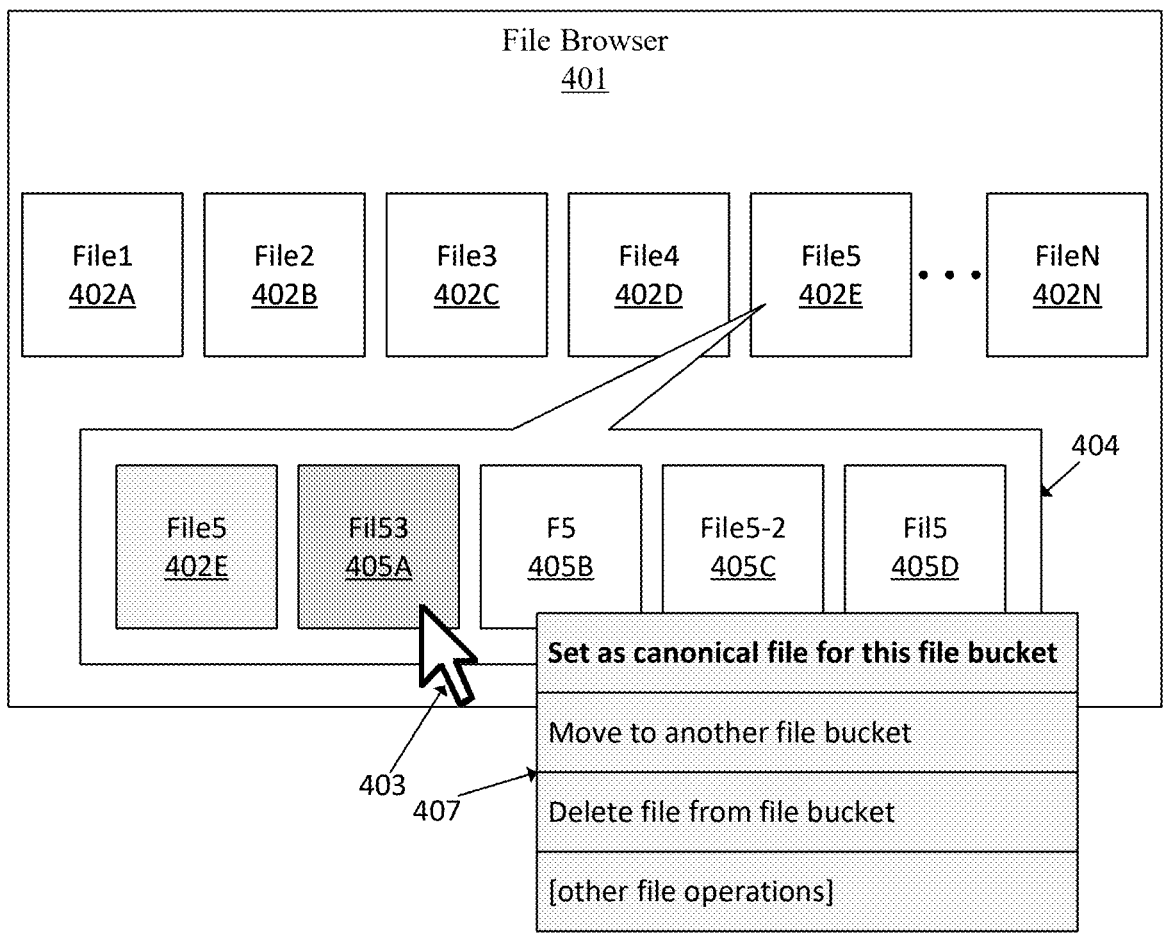
FIG. 4P is a diagram illustrating an exemplary user interface in accordance with aspects of the present disclosure.
Figure 4Q:
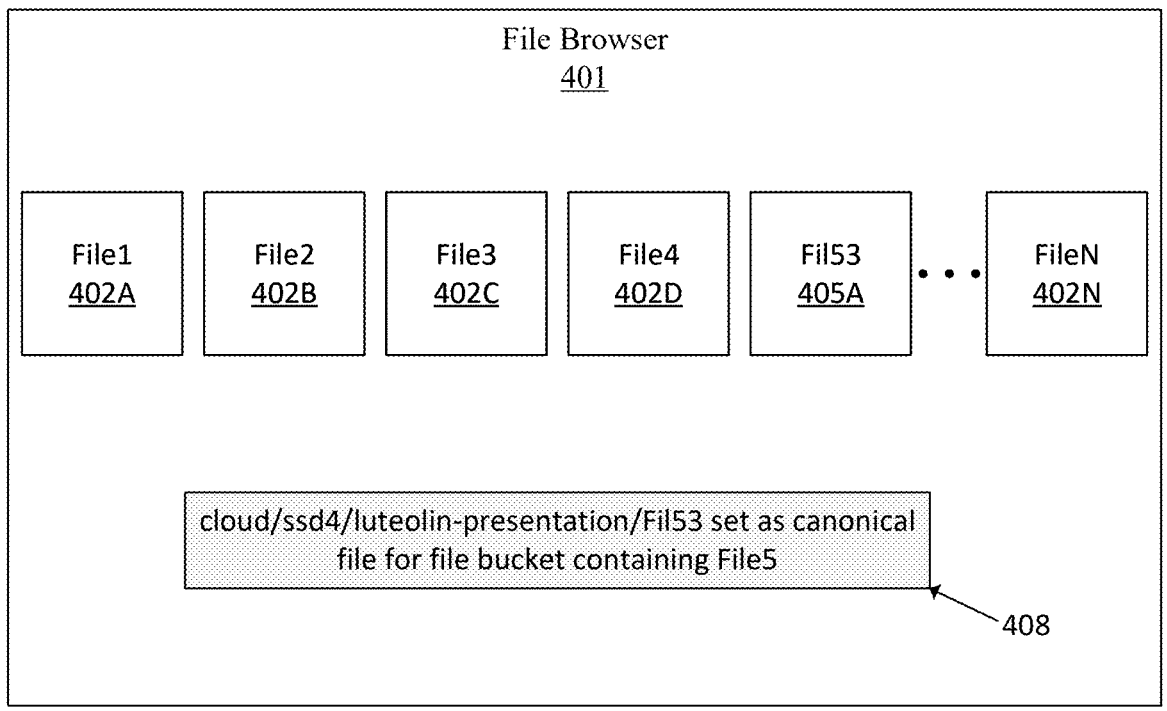
FIG. 4Q is a diagram illustrating an exemplary user interface in accordance with aspects of the present disclosure.
Figure 4R:
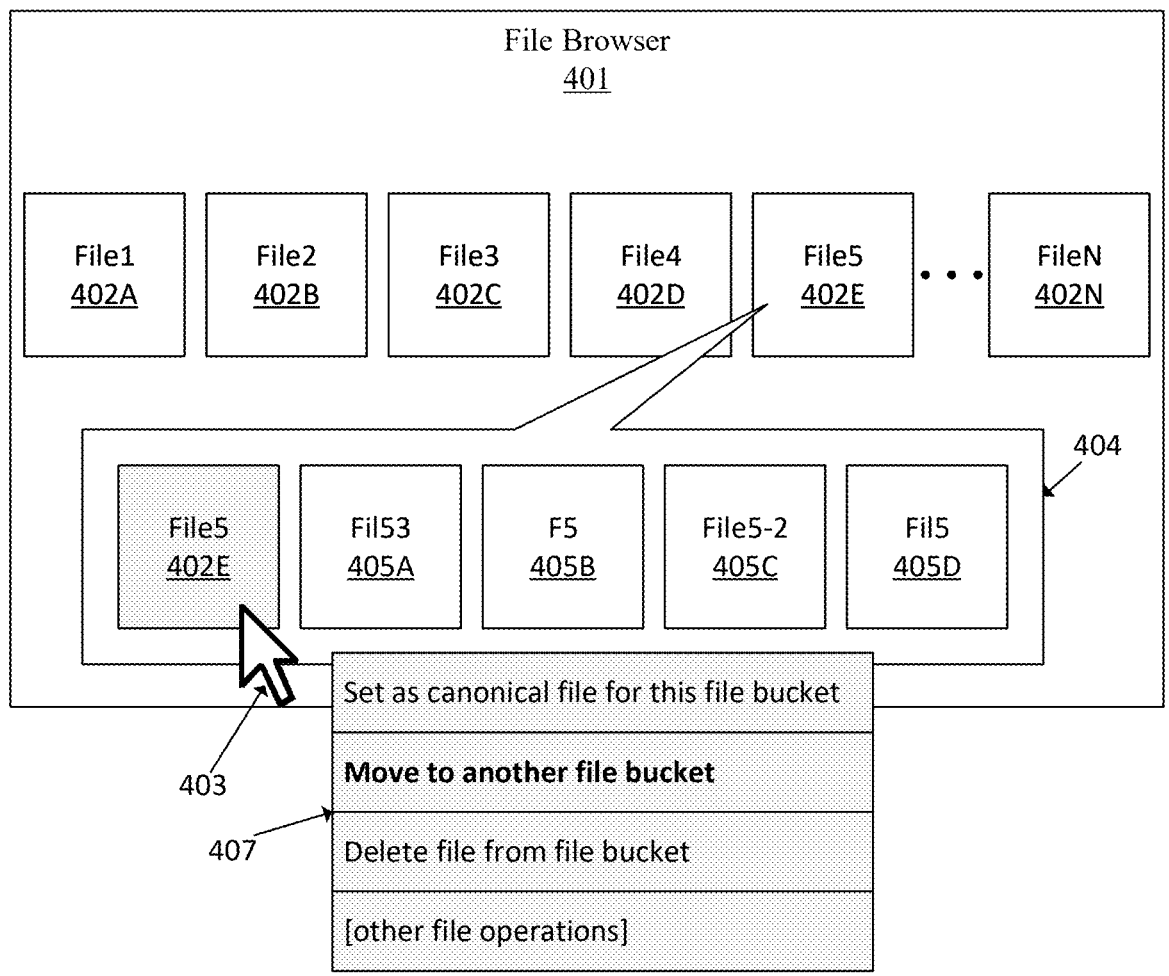
FIG. 4R is a diagram illustrating an exemplary user interface in accordance with aspects of the present disclosure.
Figure 4S:
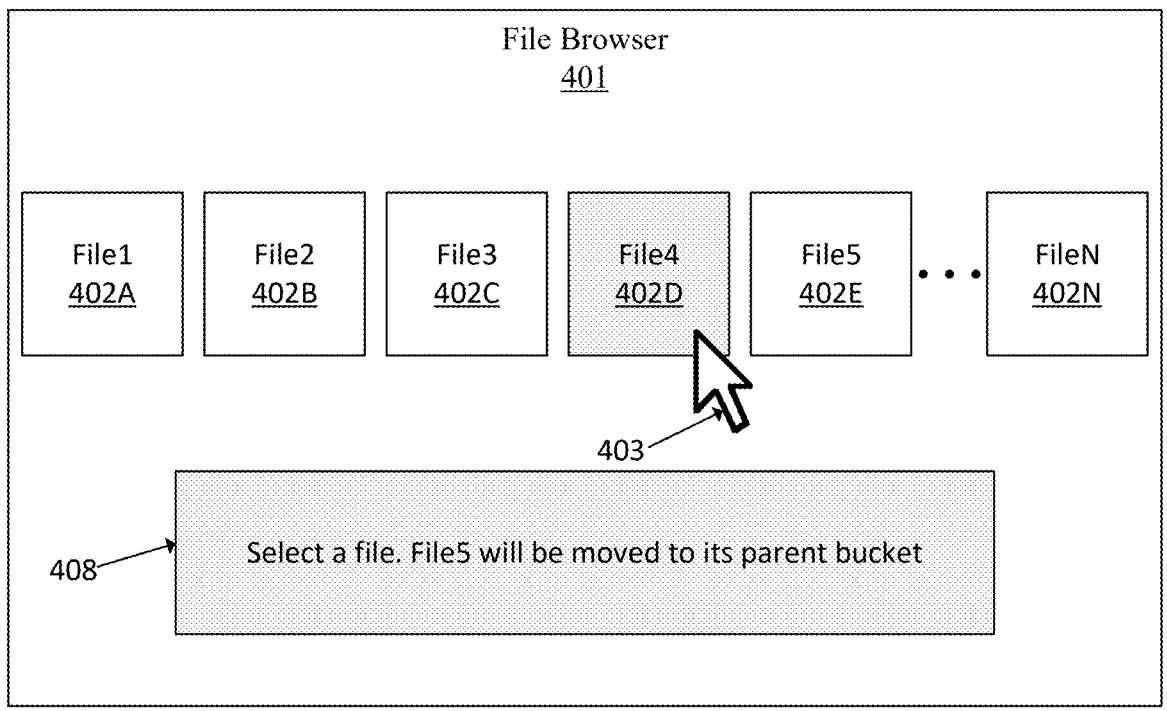
FIG. 4S is a diagram illustrating an exemplary user interface in accordance with aspects of the present disclosure.
Figure 4T:
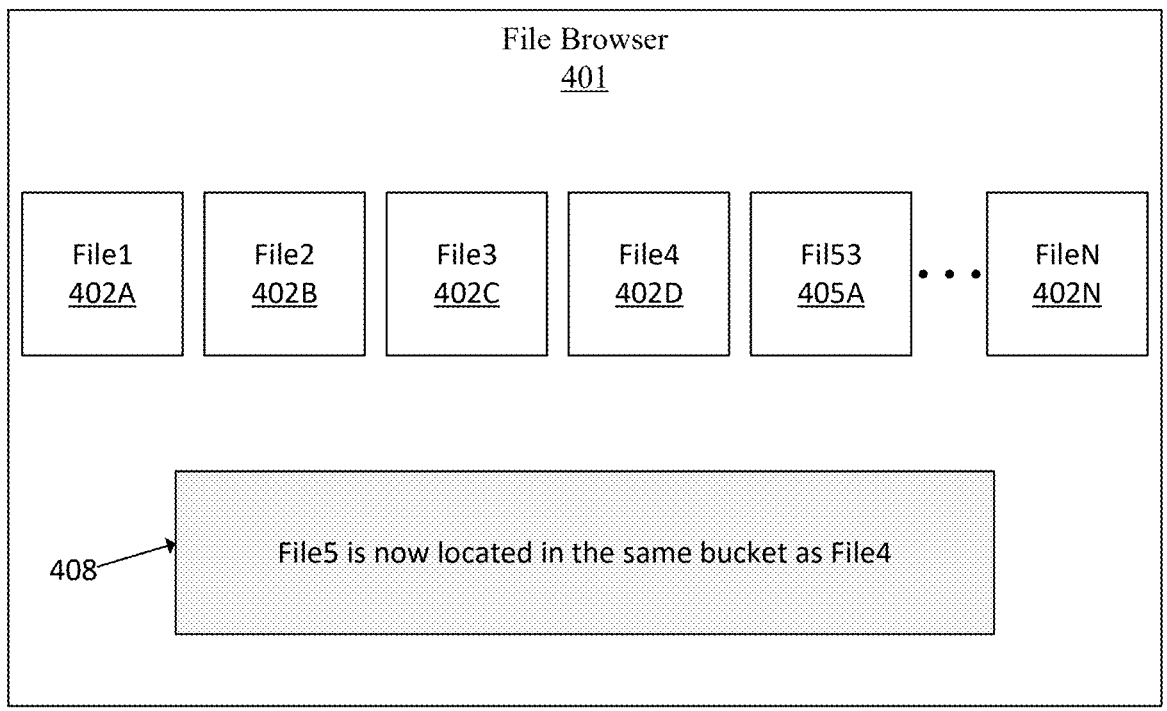
FIG. 4T is a diagram illustrating an exemplary user interface in accordance with aspects of the present disclosure.

FIGS. 4A-4T are diagrams illustrating an exemplary user interface (UI) in accordance with aspects of the present disclosure. The UI, shown in FIGS. 4A-4F, is labeled as File Browser 401. The UA may comprise one or more canonical file icons 402A-402N each corresponding to a different canonical file/file bucket. In some embodiments, the canonical file icons 402A-402N may be graphical representations of the file bucket's content. In some embodiments, the canonical file icons 402A-402N may indicate information corresponding to the file bucket or the files within the file bucket, such as file type, size of the file, length of the content within the file, etc. In some embodiments, the UI may provide a textual list of the one or more file buckets. In some embodiments, the user may select an icon from the UI and be provided with additional information and/or menu options for interacting with the file bucket.

FIG. 4B shows the selection of canonical file icon 402E by the user with cursor 403. FIG. 4C shows the display of a file bucket list 404 within the file browser 401. The file bucket list 404 may comprise the selected canonical file icon 402E and one or more bucket file icons 405A-405D, each corresponding to files in the corresponding file bucket. In some embodiments, the bucket file icons 405A-405D may each display information associated with their corresponding files.

FIG. 4D shows context menu 406. Context menu 406 may be configured to show information associated with one or more icons within the file bucket list 404. The context menu 406 may be triggered by the user hovering the cursor 403 over an icon within the file bucket list 404, for example canonical file icon 402E. Hovering cursor 403 over any icon, including bucket file icons 405A-405D may trigger corresponding context menus 406. The context menu 406 may also be triggered by a right click or other user action or gesture. As shown in FIG. 4D, the context menu 406 may show path information for the icon being interacted with by the cursor 403.

FIGS. 4E and 4F illustrate an exemplary user assisted selection process in accordance with aspects of the present disclosure. In some embodiments, the system may be configured to identify one or more file buckets requiring user input to select or verify selection of the canonical file associated with a file bucket. In some embodiments, if the system is unable to select a canonical file with a confidence level above a predetermined threshold, the user may be prompted to make a selection. In some embodiments, the user may directly select the canonical file from a list of files, select one or more additional selection criteria for the file bucket and/or adjust one or more variables/predetermined values used in the selection decision. In some embodiments, the user may select and view any of the files in the corresponding file bucket and make a decision based on analysis of the content.

In some embodiments, the UI may be configured to visually indicate one or more canonical files which failed to reach the predetermined confidence threshold. For example, in FIG. 4E, canonical file icons 402B, 402D and 402E are shown highlighted/shaded, indicating a confidence level below the predetermined threshold. The user may select an indicated icon to verify the selection or to select a different file from the file bucket as the canonical file.

FIG. 4F shows the selection of canonical file icon 402E by the user with cursor 403. Similar to FIG. 4C, the file bucket list 404 may be displayed for the selected canonical file icon. The files in the file bucket list 404 may be ranked by its relevance, including but not limited to content richness, file size, or user modified date based on user-provided settings. The user may select one of the icons within the file bucket list 404 as the canonical file for the file bucket. FIG. 4G shows the selection of bucket file 405B as the canonical file for the file bucket. FIG. 4H shows the UI with the canonical file icon 402E being replaced by the selected bucket file icon 405B. Notification box 408 may be displayed to the user with a message indicating that the canonical file has been set to bucket file icon 405B. Upon selection or verification of the canonical file for the file bucket, the highlighting/shading or other indication associated with the icon/file bucket may be removed.

FIGS. 4I-4K show a process for deleting a file from a file bucket. FIG. 4I shows the UI after a user has selected canonical file icon 402E. The user may right click or otherwise select a file bucket icon for deletion or other operations. An action selection box 407 may be displayed to the user with actions that may be performed on the selected file bucket icon. FIG. 4J shows the user selection of "Delete file from file bucket" from the action selection box 407. The selection triggers the deletion of the file associated with the file bucket icon. If the deleted file is the only file in the file bucket, the file bucket itself may be deleted as well as the canonical file icon corresponding to the deleted file. FIG. 4K shows the UI after deleting the canonical file (only file) from the file bucket. The example shows the list of canonical file icons with the canonical file icon 402E removes and notification box 408 with a message indicating deletion of the file.

In some embodiments, after the user selected deletion is performed the system may be configured to perform the canonical file identification and selection process on the bucket from which the file was deleted.

FIGS. 4L-4O show a process for merging file buckets. FIG. 4L shows a user selecting two canonical file icons 402D and 402E with cursor 403. The selection may be performed by clicking and dragging the cursor 403 to generate a selection box 409 around canonical file icons 402D and 402E. Selection may also be performed by keyboard or other input devices or combination of input devices. FIG. 4M shows the selected canonical file icons 402D and 402E highlighted and labeled as being selected, but other indications of the selection may be used. An action selection box 407 may be displayed to the user with actions that may be performed on the selected canonical file icons. The action selection box 407 is shown with the first action selected and highlighted in bold. The "Merge parent file buckets" action selected from the action selection box 407 may trigger a merging process for the file buckets associated with the selected canonical file icons 402D and 402E.

In some embodiments, the merging process may be configured to generate a new merged bucket and transfer the files from the selected buckets into the new merged bucket. The empty selected buckets may then be removed. The canonical file identification and selection process may be performed on the new merged bucket to select the bucket's canonical file as well as determine the name of the canonical file.

In some embodiments, the system may be configured to choose one of the selected file buckets as a primary bucket. The remaining selected file buckets may then be merged into or have their associated files transferred into the primary bucket. The empty buckets may then be removed, leaving only the primary bucket with all the files associated with the originally selected file buckets. FIG. 4N shows the UI after all the files from the file bucket associated with canonical file icon 402D have been transferred to the file bucket associated with canonical file icon 402E. The deleted canonical file icon 402D is represented as a dashed outline. FIG. 4N also shows the display of notification box 408, wherein the notification box displays a message indicating the merging of the selected file buckets.

FIG. 4O shows the contents of the file bucket associated with canonical file icon 402E after merging the selected file buckets. After merging, a new ranking may be performed on the files in the file bucket, wherein the ranking may be based on relevance, including but not limited to content richness, file size, or user modified date based on user-provided settings. The file bucket list 404 may be re-sorted based on the new ranking. FIG. 4O shows the re-sorted file bucket list 404.

FIGS. 4P-4Q show a process for changing the canonical file associated with a file bucket. FIG. 4P shows the process where the user has selected canonical file icon 402E. File bucket list 404 is shown with bucket file icons corresponding to the files within the file bucket. The user may select one of the bucket file icons to set as the canonical file. Selection may comprise right clicking on a bucket file icon, such as bucket file icon 405A as indicated (dark gray) in the figure. Other selection methods and input devices may be used. The selection may trigger display of context menu 406, where the user may then select the "Set as canonical file for this file bucket" option.

In some embodiments, the user feedback on the canonical file selection may be provided to the system. The system may adjust the constant parameters of the canonical file identification and selection process based on the user feedback. The adjustments may be performed with methods not limited to gradient descent and reinforcement learning with human feedback.

FIG. 4Q shows the UI with bucket file icon 405A now in place of canonical file icon 402E and notification box 408 displaying a message indicating that the canonical file has been changed.

FIGS. 4R-4T show a process of moving a selected file from one file bucket to another. FIG. 4R shows the UI after a user has selected canonical file icon 402E and right clicking on the representation of that canonical file icon in the file bucket list 404. The user may be prompted with a context menu 406, where a selection of the option for "Move to another file bucket" may be made.

FIG. 4S shows the notification box 408 prompting the user to select a target destination to move the selected file. The selected target destination may be the file bucket associated with a selected canonical file icon in the UI. In the example shown, the user has selected the canonical file icon 402D. FIG. 4T shows the results of selecting the target destination. The UI displays the notification box 408 with an indication of the new location of the file. The system may be configured to select a new canonical file for a bucket if the canonical file is moved to another bucket. In this example, the file bucket that originally contained the file corresponding to canonical file icon 402E is displayed with the bucket file icon 405A being displayed as the new canonical file for the bucket.

FIG. 5 is a flow chart illustrating an exemplary method for sorting files in a filesystem 500 that may be performed in accordance with some embodiments.

At step 501, the system may be configured to Prepare a plurality of objects for sorting, wherein the preparing comprises generating a pool of objects by digitizing the plurality of objects and removing artifacts.

At step 502, the system may be configured to perform a Reverse Path Crawl over the pool of objects. The Reverse Path Crawl may comprise, fetching path information for each object, flattening, for each object, the path information into a path list and performing, for each path list, a pairwise matching.

At step 503, the system may be configured to create, based on the Reverse Path Crawl, one or more object buckets.

At step 504, the system may be configured to cluster the plurality of objects into the one or more object buckets based on the Reverse Path Crawl.

At step 505, the system may be configured to create one or more merged buckets by combining, into a single merged bucket, one or more object buckets that share one or more properties.

At step 506, the system may be configured to split each merged bucket into one or more dissimilar buckets. In some embodiments, splitting each merged bucket into one or more dissimilar buckets may comprise calculating, for every pair of objects in each merged bucket, a similarity score. The system may then create, based on the calculated similarity scores, one or more graphs of strongly connected objects, wherein the similarity score for all the strongly connected objects of the graph are above a predetermined threshold. Based on the one or more graphs of strongly connected objects, a dissimilar bucket may be created, wherein the dissimilar bucket corresponds to a group of strongly connected objects within said graphs.

At step 507, the system may be configured to select, for each dissimilar bucket, a canonical object. In some embodiments, the selecting may comprise extracting content from each object in each dissimilar bucket, calculating, for each object, a richest content score based on the extracted content and selecting the canonical object based at least in part on the richest content score.

At step 508, the system may be configured to generate, for each canonical object, a canonical name, wherein the canonical name is representative of the objects in the associated dissimilar bucket. In some embodiments, the canonical name may be generated based on names of the objects in the dissimilar bucket, paths of the objects in the dissimilar bucket and content of the objects in the dissimilar bucket.

At step 509, the system may be configured to generate a sorted bucket list, wherein the list comprises each dissimilar bucket.

At step 510, the system may be configured to display, in a user interface, a graphical representation of one or more dissimilar buckets. In some embodiments, the graphical representation may comprise the canonical name associated with the canonical object of the dissimilar bucket.

Figure 6:
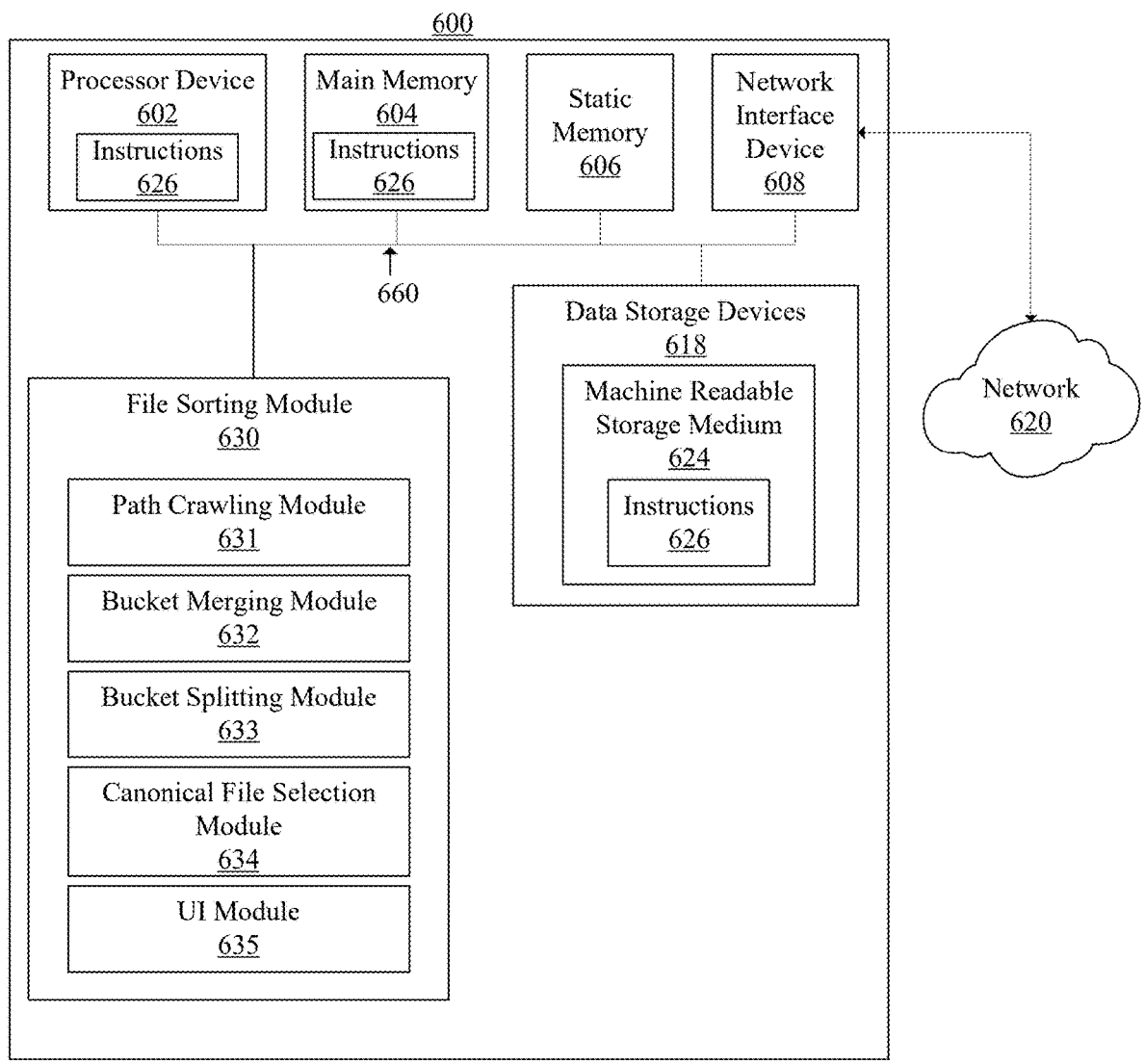
FIG. 6 is a diagram illustrating an exemplary computer/control system that may perform processing in some embodiments and in accordance with aspects of the present disclosure.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 660.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620.

The computer system 600 may also include file sorter module 630. File sorter module 630 may comprise path crawling module 631, bucket merging module 632, bucket splitting module 633, canonical file selection module 634 and UI module 635.

File sorter module 630, path crawling module 631, bucket merging module 632, bucket splitting module 633, canonical file selection module 634 and UI module 635 may be the same or similar to that of file sorter module 203, path crawling module 204, bucket merging module 205, bucket splitting module 206, canonical file selection module 207 and UI module 208 as disclosed in FIG. 2.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media. Information, including data used in the processes and methods of the system and the one or more sets of instructions or software, may also be stored in blockchain, as NFTs or other decentralized technologies.

In one implementation, the instructions 626 include instructions to implement functionality corresponding to the components of a device to perform the disclosure herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

It will be appreciated that the present disclosure may include any one and up to all of the following examples.

Example 1. A method for sorting objects, wherein the method comprises: preparing a plurality of objects for sorting, wherein the preparing comprises generating a pool of objects by digitizing the plurality of objects and removing artifacts; performing a Reverse Path Crawl over the pool of objects; creating, based on the Reverse Path Crawl, one or more object buckets; clustering the plurality of objects into the one or more object buckets based on the Reverse Path Crawl; creating one or more merged buckets by combining, into a single merged bucket, one or more object buckets that share one or more properties; splitting each merged bucket into one or more dissimilar buckets; selecting, for each dissimilar bucket, a canonical object; generating, for each canonical object, a canonical name, wherein the canonical name is representative of the objects in the associated dissimilar bucket; generating a sorted bucket list, wherein the sorted bucket list comprises each dissimilar bucket; and displaying, in a user interface, a graphical representation of one or more dissimilar buckets.

Example 2. The Method of Example 1, wherein the Reverse Path Crawl comprises: fetching path information for each object; flattening, for each object, the path information into a path list; and performing, for each path list, a pairwise matching.

Example 3. The Method of any one of Examples 1-2, wherein splitting each merged bucket into one or more dissimilar buckets comprises: calculating, for every pair of objects in each merged bucket, a similarity score; creating, based on the calculated similarity scores, one or more graphs of strongly connected objects, wherein the similarity score for all the strongly connected objects of the graph are above a predetermined threshold; and creating, based on the one or more graphs of strongly connected objects, a dissimilar bucket corresponding to a group of strongly connected objects within said graphs.

Example 4. The Method of any one of Examples 1-3, wherein selecting, for each dissimilar bucket, the canonical object comprises: extracting content from each object in each dissimilar bucket; calculating, for each object, a richest content score based on the extracted content; and selecting, for each dissimilar bucket, the canonical object based at least in part on the richest content score.

Example 5. The Method of any one of Examples 1-4, wherein the canonical name is generated based on names of the objects in the dissimilar bucket, paths of the objects in the dissimilar bucket and content of the objects in the dissimilar bucket.

Example 6. The Method of any one of Examples 1-5, wherein the graphical representation comprises the canonical name associated with the canonical object of the dissimilar bucket.

Example 7. The Method of any one of Examples 1-6, wherein the plurality of objects are files in a filesystem.

Example 8. A system for sorting objects, wherein the system comprises: a client device; a filesystem operating on the client device; a datastore, storing a plurality of files; and a file sorting module, operating on the client device, wherein the file sorting module is configured to: prepare the plurality of files for sorting, wherein the preparing comprises generating a pool of files by digitizing the plurality of files and removing artifacts; perform a Reverse Path Crawl over the pool of files; create, based on the Reverse Path Crawl, one or more file buckets; cluster the plurality of files into the one or more file buckets based on the Reverse Path Crawl; create one or more merged buckets by combining, into a single merged bucket, one or more file buckets that share one or more properties; split each merged bucket into one or more dissimilar buckets; select, for each dissimilar bucket, a canonical file; generate, for each canonical file, a canonical name, wherein the canonical name is representative of the files in the associated dissimilar bucket; generate a sorted bucket list, wherein the sorted bucket list comprises each dissimilar bucket; and display, in a user interface executed on the client device, a graphical representation of one or more dissimilar buckets.

Example 9. The System of Example 8, wherein the Reverse Path Crawl comprises: fetching path information for each object; flattening, for each object, the path information into a path list; and performing, for each path list, a pairwise matching.

Example 10. The System of any one of Examples 8-9, wherein splitting each merged bucket into one or more dissimilar buckets comprises: calculating, for every pair of objects in each merged bucket, a similarity score; creating, based on the calculated similarity scores, one or more graphs of strongly connected objects, wherein the similarity score for all the strongly connected objects of the graph are above a predetermined threshold; and creating, based on the one or more graphs of strongly connected objects, a dissimilar bucket corresponding to a group of strongly connected objects within said graphs.

Example 11. The System of any one of Examples 8-10, wherein selecting, for each dissimilar bucket, the canonical object comprises: extracting content from each object in each dissimilar bucket; calculating, for each object, a richest content score based on the extracted content; and selecting, for each dissimilar bucket, the canonical object based at least in part on the richest content score.

Example 12. The System of any one of Examples 8-11, wherein the canonical name is generated based on names of the objects in the dissimilar bucket, paths of the objects in the dissimilar bucket and content of the objects in the dissimilar bucket.

Example 13. The System of any one of Examples 8-12, wherein the graphical representation comprises the canonical name associated with the canonical object of the dissimilar bucket.

Example 14. A non-transitory computer-readable medium storing a file sorting program including instructions that, when executed by a processor, cause the processor to perform a method comprising: preparing a plurality of files for sorting, wherein the preparing comprises generating a pool of files by digitizing the plurality of files and removing artifacts; performing a Reverse Path Crawl over the pool of files; creating, based on the Reverse Path Crawl, one or more file buckets; clustering the plurality of files into the one or more file buckets based on the Reverse Path Crawl; creating one or more merged buckets by combining, into a single merged bucket, one or more file buckets that share one or more properties; splitting each merged bucket into one or more dissimilar buckets; selecting, for each dissimilar bucket, a canonical file; generating, for each canonical file, a canonical name, wherein the canonical name is representative of the files in the associated dissimilar bucket; generating a sorted bucket list, wherein the sorted bucket list comprises each dissimilar bucket; and displaying, in a user interface executed on the client device, a graphical representation of one or more dissimilar buckets.

Example 15. The non-transitory computer-readable medium of Example 14, wherein the Reverse Path Crawl comprises: fetching path information for each object; flattening, for each object, the path information into a path list; and performing, for each path list, a pairwise matching.

Example 16. The non-transitory computer-readable medium of any one of Examples 14-15, wherein splitting each merged bucket into one or more dissimilar buckets comprises: calculating, for every pair of objects in each merged bucket, a similarity score; creating, based on the calculated similarity scores, one or more graphs of strongly connected objects, wherein the similarity score for all the strongly connected objects of the graph are above a predetermined threshold; and creating, based on the one or more graphs of strongly connected objects, a dissimilar bucket corresponding to a group of strongly connected objects within said graphs.

Example 17. The non-transitory computer-readable medium of any one of Examples 14-16, wherein selecting, for each dissimilar bucket, the canonical object comprises: extracting content from each object in each dissimilar bucket; calculating, for each object, a richest content score based on the extracted content; and selecting, for each dissimilar bucket, the canonical object based at least in part on the richest content score.

Example 18. The non-transitory computer-readable medium of any one of Examples 14-17, wherein the canonical name is generated based on names of the objects in the dissimilar bucket, paths of the objects in the dissimilar bucket and content of the objects in the dissimilar bucket.

Example 19. The non-transitory computer-readable medium of any one of Examples 14-18, wherein the graphical representation comprises the canonical name associated with the canonical object of the dissimilar bucket.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for file management, wherein the method comprises:
   preparing a plurality of objects for sorting, wherein the preparing comprises generating a pool of objects by digitizing the plurality of objects and removing artifacts;
   performing a reverse path crawl over the pool of objects;
   creating, based on the reverse path crawl, one or more object buckets;
   clustering the plurality of objects into the one or more object buckets based on the reverse path crawl;
   creating one or more merged buckets by combining, into a single merged bucket, one or more object buckets that share one or more properties;
   splitting each merged bucket into one or more dissimilar buckets;
   selecting, for each dissimilar bucket, a canonical object;
   generating, for each canonical object, a canonical name, wherein the canonical name is representative of the objects in the associated dissimilar bucket;
   generating a sorted bucket list, wherein the sorted bucket list comprises each dissimilar bucket; and
   displaying, in a user interface, a graphical representation of one or more dissimilar buckets.

2. The method of claim 1, wherein the reverse path crawl comprises:
   fetching path information for each object;
   flattening, for each object, the path information into a path list; and
   performing, for each path list, a pairwise matching.

3. The method of claim 2, wherein splitting each merged bucket into one or more dissimilar buckets comprises:
   calculating, for every pair of objects in each merged bucket, a similarity score;
   creating, based on the calculated similarity scores, one or more graphs of strongly connected objects, wherein the similarity score for all the strongly connected objects of the graph are above a predetermined threshold; and creating, based on the one or more graphs of strongly connected objects, a dissimilar bucket corresponding to a group of strongly connected objects within said graphs.

4. The method of claim 3, wherein selecting, for each dissimilar bucket, the canonical object comprises:
   extracting content from each object in each dissimilar bucket;
   calculating, for each object, a richest content score based on the extracted content; and
   selecting, for each dissimilar bucket, the canonical object based at least in part on the richest content score.

5. The method of claim 4, wherein the canonical name is generated based on names of the objects in the dissimilar bucket, paths of the objects in the dissimilar bucket and content of the objects in the dissimilar bucket.

6. The method of claim 5, wherein the graphical representation comprises the canonical name associated with the canonical object of the dissimilar bucket.

7. The method of claim 6, wherein the plurality of objects are files in a filesystem.

8. A computer system having a file management system, wherein the computer system comprises:
   a processor, memory and a non-transitory computer-readable medium;
   the filesystem operating on the computer system;
   a datastore, storing a plurality of files; and
   a file sorting module, operating on the computer system, wherein the file sorting module is configured to:
      prepare the plurality of files for sorting, wherein the preparing comprises generating a pool of files by digitizing the plurality of files and removing artifacts;
      perform a reverse path crawl over the pool of files;
      create, based on the reverse path crawl, one or more file buckets;
      cluster the plurality of files into the one or more file buckets based on the reverse path crawl;
      create one or more merged buckets by combining, into a single merged bucket, one or more file buckets that share one or more properties;
      split each merged bucket into one or more dissimilar buckets;
      select, for each dissimilar bucket, a canonical file;
      generate, for each canonical file, a canonical name, wherein the canonical name is representative of the files in the associated dissimilar bucket;
      generate a sorted bucket list, wherein the sorted bucket list comprises each dissimilar bucket; and
      display, in a user interface executed on the computer system, a graphical representation of one or more dissimilar buckets.

9. The system of claim 8, wherein the reverse path crawl comprises:
   fetching path information for each file;
   flattening, for each file, the path information into a path list; and
   performing, for each path list, a pairwise matching.

10. The system of claim 9, wherein splitting each merged bucket into one or more dissimilar buckets comprises:
    calculating, for every pair of files in each merged bucket, a similarity score;
    creating, based on the calculated similarity scores, one or more graphs of strongly connected files, wherein the similarity score for all the strongly connected files of the graph are above a predetermined threshold; and
    creating, based on the one or more graphs of strongly connected files, a dissimilar bucket corresponding to a group of strongly connected files within said graphs.

11. The system of claim 10, wherein selecting, for each dissimilar bucket, the canonical file comprises:
    extracting content from each file in each dissimilar bucket;
    calculating, for each file, a richest content score based on the extracted content; and
    selecting, for each dissimilar bucket, the canonical file based at least in part on the richest content score.

12. The system of claim 11, wherein the canonical name is generated based on names of the files in the dissimilar bucket, paths of the files in the dissimilar bucket and content of the files in the dissimilar bucket.

13. The system of claim 12, wherein the graphical representation comprises the canonical name associated with the canonical file of the dissimilar bucket.

14. A non-transitory computer-readable medium storing a file management program including instructions that, when executed by a processor, cause the processor to perform a method comprising:
    preparing a plurality of files for sorting, wherein the preparing comprises generating a pool of files by digitizing the plurality of files and removing artifacts;
    performing a reverse path crawl over the pool of files;
    creating, based on the reverse path crawl, one or more file buckets;
    clustering the plurality of files into the one or more file buckets based on the reverse path crawl;
    creating one or more merged buckets by combining, into a single merged bucket, one or more file buckets that share one or more properties;
    splitting each merged bucket into one or more dissimilar buckets;
    selecting, for each dissimilar bucket, a canonical file;
    generating, for each canonical file, a canonical name, wherein the canonical name is representative of the files in the associated dissimilar bucket;
    generating a sorted bucket list, wherein the sorted bucket list comprises each dissimilar bucket; and
    displaying, in a user interface executed via a computer system, a graphical representation of one or more dissimilar buckets.

15. The non-transitory computer-readable medium of claim 14, wherein the reverse path crawl comprises:
    fetching path information for each file;
    flattening, for each file, the path information into a path list; and
    performing, for each path list, a pairwise matching.

16. The non-transitory computer-readable medium of claim 15, wherein splitting each merged bucket into one or more dissimilar buckets comprises:
    calculating, for every pair of files in each merged bucket, a similarity score;
    creating, based on the calculated similarity scores, one or more graphs of strongly connected files, wherein the similarity score for all the strongly connected files of the graph are above a predetermined threshold; and
    creating, based on the one or more graphs of strongly connected files, a dissimilar bucket corresponding to a group of strongly connected files within said graphs.

17. The non-transitory computer-readable medium of claim 16, wherein selecting, for each dissimilar bucket, the canonical file comprises:
    extracting content from each file in each dissimilar bucket;

calculating, for each file, a richest content score based on the extracted content; and selecting, for each dissimilar bucket, the canonical file based at least in part on the richest content score.

18. The non-transitory computer-readable medium of claim 17, wherein the canonical name is generated based on names of the files in the dissimilar bucket, paths of the files in the dissimilar bucket and content of the files in the dissimilar bucket.

19. The non-transitory computer-readable medium of claim 18, wherein the graphical representation comprises the canonical name associated with the canonical file of the dissimilar bucket.

\* \* \* \* \*